United States Patent
Ishii

(10) Patent No.: US 10,687,270 B2
(45) Date of Patent: Jun. 16, 2020

(54) ON-DEMAND SYSTEM INFORMATION FOR WIRELESS TELECOMMUNICATIONS

(71) Applicants: Sharp Kabushiki Kaisha, Sakai, Osaka (JP); FG Innovation Company Limited, Tuen Mun, New Territories, Hong Kong (CN)

(72) Inventor: Atsushi Ishii, Vancouver, WA (US)

(73) Assignees: Sharp Kabushiki Kaisha, Sakai, Osaka (JP); FG Innovation Company Limited, Hong Kong (CN)

( * ) Notice: Subject to any disclaimer, the term of this patent is extended or adjusted under 35 U.S.C. 154(b) by 0 days.

(21) Appl. No.: 15/658,980

(22) Filed: Jul. 25, 2017

(65) Prior Publication Data

US 2018/0035361 A1     Feb. 1, 2018

Related U.S. Application Data

(60) Provisional application No. 62/367,447, filed on Jul. 27, 2016.

(51) Int. Cl.
| | | |
|---|---|---|
| *H04W 48/10* | (2009.01) | |
| *H04W 48/14* | (2009.01) | |
| *H04W 48/12* | (2009.01) | |

(52) U.S. Cl.
CPC .......... *H04W 48/14* (2013.01); *H04W 48/10* (2013.01); *H04W 48/12* (2013.01)

(58) Field of Classification Search
CPC ...... H04W 48/14; H04W 48/10; H04W 48/12
See application file for complete search history.

(56) References Cited

U.S. PATENT DOCUMENTS

| | | | |
|---|---|---|---|
| 8,538,444 B2 | 9/2013 | Lee et al. | |
| 2009/0262693 A1 | 10/2009 | Wang et al. | |
| 2010/0227611 A1* | 9/2010 | Schmidt | H04W 4/06 455/434 |
| 2013/0051325 A1 | 2/2013 | Ryu et al. | |
| 2015/0334766 A1* | 11/2015 | Lee | H04W 48/12 455/435.1 |
| 2015/0382284 A1 | 12/2015 | Brismar et al. | |
| 2016/0100422 A1* | 4/2016 | Papasakellariou | H04L 1/1861 370/329 |
| 2016/0143017 A1* | 5/2016 | Yang | H04L 1/1812 370/329 |
| 2017/0034074 A1* | 2/2017 | Wu | H04L 47/15 |
| 2017/0311341 A1* | 10/2017 | Patil | H04W 4/06 |

(Continued)

FOREIGN PATENT DOCUMENTS

| | | |
|---|---|---|
| EP | 2 816 741 A2 | 12/2014 |
| WO | WO 2008/044664 A1 | 4/2008 |
| WO | 2015/000912 A1 | 1/2015 |

(Continued)

OTHER PUBLICATIONS

R2-163853, 3GPP TSG-RAN WG2 Meeting #94, ETRI, "System information handling in NR", Nanjing, China, May 23-27, 2016.

(Continued)

*Primary Examiner* — Asghar H Bilgrami
(74) *Attorney, Agent, or Firm* — Nixon & Vanderhye P.C.

(57) ABSTRACT

Techniques, apparatus, and methods are provided in conjunction with differentiated delivery of system information (SI) in a wireless communications network.

16 Claims, 13 Drawing Sheets

(56) References Cited

U.S. PATENT DOCUMENTS

2018/0206139 A1* 7/2018 Wang ................ H04B 7/15507

FOREIGN PATENT DOCUMENTS

| WO | 2015/113653 A1 | 8/2015 |
|---|---|---|
| WO | 2016/045409 A1 | 3/2016 |
| WO | 2016/114150 A1 | 7/2016 |

OTHER PUBLICATIONS

R2-163743, 3GPP TSG-RAN WG2 Meeting #94, ZTE, "Consideration on the System Information in NR", Nanjing, P.R. China, May 23-27, 2016.
R2-163586, 3GPP TSG-RAN WG2 Meeting #94, Intel Corporation, "System information for standalone NR deployment", Nanjing, China, May 23-27, 2016.
R2-163470, 3GPP TSG RAN WG2 Meeting #94, CATT, "System information in NR", Nanjing, China, May 23-27, 2016.
R2-163371, 3GPP TSG-RAN WG2 Meeting #94, Samsung, "System Information Signalling Design in NR", Nanjing, China, May 23-27, 2016.
R2-164127, 3GPP TSG-RAN2 Meeting #94, Huawei, HiSilicon, "System information design", Nanjing, China, May 23-27, 2016.
R2-164122, 3GPP TSG-RAN WG2 Meeting #94, Qualcomm Incorporated, Convida Wireless, "NR System Information Provisioning", Nanjing, China, May 23-27, 2016.
Tdoc R2-164088, 3GPP TSG-RAN WG2 #94, InterDigital Communications, "System Information Acquisition for New Radio Access", Nanjing, China, May 23-27, 2016.

R2-164078, 3GPP TSG-RAN WG2 #94 R2-164078, LG Electronics Inc., "Observations about on-demand SI delivery mechanism", Nanjing, China, May 23-27, 2016.
R2-164067, 3GPP TSG-RAN WG2 Meeting #94, Convida Wireless, "NR System Information Aspects", Nanjing, China, May 23-27, 2016.
Tdoc R2-164006, 3GPP TSG-RAN WG2 #94, Ericsson, "Requirements for System Information distribution", Nanjing, P.R. China, May 23-27, 2016.
Tdoc R2-163997, 3GPP TSG-RAN WG2 #94, Ericsson, "Solution principles for system information distribution", Nanjing, P.R. China, May 23-27, 2016.
R2-163980, 3GPP TSG RAN WG2 Meeting #94, NEC, "System information on demand in standalone NR", Nanjing, China, May 23-27, 2016.
R2-163977, 3GPP TSG RAN WG2 Meeting #94, Sony, "System Information Enhancements for NR", Nanjing, China, May 23-27, 2016.
R2-163975, 3GPP TSG-RAN WG2 #94, NTT Docomo, Inc., "System Information design for standalone NR operation", Nanjing, China, May 23-27, 2016.
International Search Report and Written Opinion dated Oct. 20, 2017 in PCT application PCT/US17/43643.
International Preliminary Report on Patentability dated Jan. 29, 2019 in PCT application PCT/US2017/043643.
Notice of Allowance dated Feb. 21, 2019 in U.S. Appl. No. 15/659,060.
Allowed Claims from U.S. Appl. No. 15/659,060.
Provisional U.S. Appl. No. 62/334,706 filed May 11, 2016, entitled "System & Method of Signaling System Information".
EP Supplementary Search Report dated Feb. 6, 2020 in EP Patent Application 17835094.8.

* cited by examiner

ON-DEMAND SYSTEM INFORMATION FOR WIRELESS TELECOMMUNICATIONS

This application claims the priority and benefit of U.S. provisional patent application 62/367,447, filed Jul. 27, 2016, which is incorporated herein by reference in its entirety.

TECHNICAL FIELD

The technology relates to wireless communications, and particularly to methods and apparatus for requesting, transmitting, and using system information (SI) in wireless communications.

BACKGROUND

In wireless communication systems, a radio access network generally comprises one or more access nodes (such as a base station) which communicate on radio channels over a radio or air interface with plural wireless terminals. In some technologies such a wireless terminal is also called a User Equipment (UE). A group known as the 3rd Generation Partnership Project ("3GPP") has undertaken to define globally applicable technical specifications and technical reports for present and future generation wireless communication systems. The 3GPP Long Term Evolution ("LTE") and 3GPP LTE Advanced (LTE-A) are projects to improve an earlier Universal Mobile Telecommunications System ("UMTS") mobile phone or device standard in a manner to cope with future requirements.

In typical cellular mobile communication systems, the base station broadcasts on the radio channels certain information which is required for mobile stations to access to the network. In Long-Term Evolution (LTE) and LTE Advanced (LTE-A), such information is called "system information" ("SI"). Each access node, such as an evolved NodeB ("eNB"), broadcasts such system information to its coverage area via several System Information Blocks (SIBs) on downlink radio resources allocated to the access node.

A wireless terminal ("UE"), after entering a coverage area of an eNB, is required to obtain all the SIBs which are necessary to access to the system. For sake of UEs under coverage, the eNB periodically broadcasts all SIBs relevant for offered services, not just SIBs that are required for access to the system. Each type of SIBs is transmitted in a designated radio resource(s) with its own pre-determined/configurable frequency.

This all-broadcast-based periodic delivery method (e.g., collective broadcast of all SIBs, not just those necessary for system access) is efficient under a condition where many UEs are almost always flowing into the coverage area (such as a macro cell). However, this approach may result in wasting valuable radio resources in case of small cell deployment. Therefore, more efficient methods of SIB transmission are desired.

What is needed, therefore, and an example object of the technology disclosed herein, are methods, apparatus, and techniques for more efficient transmission of system information blocks (SIBs).

SUMMARY

An example non-limiting aspect of the technology disclosed herein concerns an access node of a radio access network. The access node comprises a transmitter, a receiver, and processor circuitry. The transmitter is configured to transmit system information over a radio interface. The receiver is configured to receive a request message—a demand for second type system information—from at least one wireless terminal over the radio interface. The processor circuitry is configured: to schedule periodic transmissions by the transmitter of first type system information over the radio interface; and, in response to the request message and separately from the periodic transmissions of the first type system information, to schedule transmission by the transmitter of second type system information over the radio interface to the at least one wireless terminal.

In another of its example aspects the technology disclosed herein concerns a method in an access node of a radio access network. In a basic example embodiment and mode the method comprises: scheduling periodic transmissions of first type system information over the radio interface; and, in response to a request message received over a radio interface from the wireless terminal and separately from the periodic transmissions of the first type system information, scheduling transmission of second type system information over the radio interface to at least one wireless terminal.

In another of its example aspects the technology disclosed herein concerns a wireless terminal which communications over a radio interface with an access node of a radio access network (RAN). In a basic example embodiment and mode the wireless terminal comprises a receiver, wireless terminal processing circuitry, and a transmitter. The receiver is configured to receive a first type system information broadcast message periodically broadcast from the access node and comprising first type system information. The wireless terminal processor circuitry is configured to generate a request message to request second type system information not included in the first type system information broadcast message. The transmitter is configured to transmit the request message to the access node. The receiver is further configured to receive the second type system information transmitted from the access node in response to the request message.

In another of its example aspects the technology disclosed herein concerns a method in a wireless terminal which communications over a radio interface with an access node of a radio access network (RAN). In an example basic embodiment and mode the method comprises receiving a first type system information broadcast message periodically broadcast from the access node and comprising first type system information; generating a request message to request second type system information not included in the first type system information broadcast message; transmitting the request message to the access node; and, receiving the second type system information transmitted from the access node in response to the request message.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1:
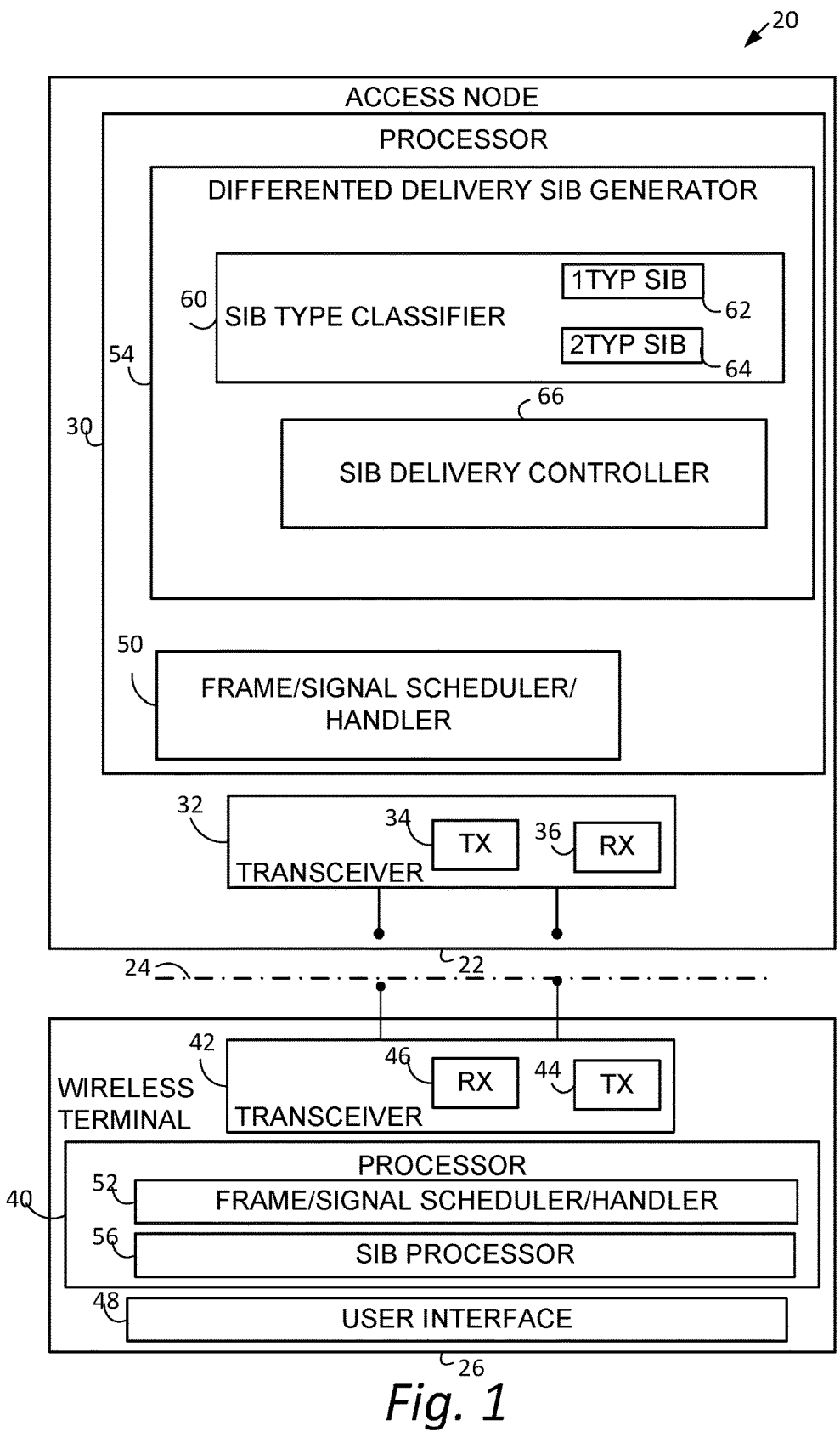
FIG. 1 is a schematic view showing an example communications system comprising a radio access node and a wireless terminal, and wherein the radio access node provides differentiated delivery of system information (SI).

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a 5G (New Radio [NR]) gNB, or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, and/or 12), the scope of the present disclosure should not be limited in this regard. At least some aspects of the systems and methods disclosed herein may be utilized in other types of wireless communication systems.

As used herein, the term "telecommunication system" or "communications system" or "system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information.

FIG. 1 shows an example communications system 20 wherein radio access node 22 communicates over air or radio interface 24 (e.g., Uu interface) with wireless terminal 26. As mentioned above, the radio access node 22 may be any suitable node for communicating with the wireless terminal 26, such as a base station node, or eNodeB ("eNB"), for example. The node 22 comprises node processor circuitry ("node processor 30") and node transceiver circuitry 32. The node transceiver circuitry 32 typically comprises node transmitter circuitry 34 and node receiver circuitry 36, which are also called node transmitter and node receiver, respectively.

The wireless terminal 26 comprises terminal processor 40 and terminal transceiver circuitry 42. The terminal transceiver circuitry 42 typically comprises terminal transmitter circuitry 44 and terminal receiver circuitry 46, which are also called terminal transmitter 44 and terminal receiver 46, respectively. The wireless terminal 26 also typically comprises user interface 48. The terminal user interface 48 may serve for both user input and output operations, and may comprise (for example) a screen such as a touch screen that can both display information to the user and receive information entered by the user. The user interface 48 may also include other types of devices, such as a speaker, a microphone, or a haptic feedback device, for example.

For both the radio access node 22 and radio interface 24, the respective transceiver circuitries 22 includes antenna(s). The respective transmitter circuits 34 and 44 may comprise, e.g., amplifier(s), modulation circuitry and other conventional transmission equipment. The respective receiver circuits 36 and 46 may comprise, e.g., e.g., amplifiers, demodulation circuitry, and other conventional receiver equipment.

In general operation node 22 and wireless terminal 26 communicate with each other across radio interface 24 using predefined configurations of information. By way of non-limiting example, the radio access node 22 and wireless terminal 26 may communicate over radio interface 24 using "frames" of information that may be configured to include various channels. In Long Term Evolution (LTE), for example, a frame, which may have both downlink portion(s) and uplink portion(s), may comprise plural subframes, with each LTE subframe in turn being divided into two slots. The frame may be conceptualized as a resource grid (a two dimensional grid) comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. The frame and subframe structure serves only as an example of a technique of formatting of information that is to be transmitted over a radio or air interface. It should be understood that "frame" and "subframe" may be utilized interchangeably or may include or be realized by other units of information formatting, and as such may bear other terminology (such as blocks, for example).

To cater to the transmission of information between radio access node 22 and wireless terminal 26 over radio interface 24, the node processor 30 and terminal processor 40 of FIG. 1 are shown as comprising respective information handlers. For an example implementation in which the information is communicated via frames, the information handler for radio access node 22 is shown as node frame/signal scheduler/handler 50, while the information handler for wireless terminal 26 is shown as terminal frame/signal handler 52.

The node processor 30 of radio access node 22 also includes a system information (SI) generator 54. In certain aspects of the technology disclosed herein, system information (SI) is classified into plural categories or types, and delivery of each category or type of system information (SI) is separately triggered and thus separately delivered across radio interface 24 to one or more wireless terminals. Accordingly, the system information (SI) generator of radio access node 22 is also known as differentiated delivery SIB generator 54.

The wireless terminal 26 uses the system information (SI) generated by radio access node 22, and even in some example implementations specifically requests certain system information (SI), in on-demand fashion. To that end the terminal processor 40 of wireless terminal 26 is shown as comprising SIB processor 56.

In view of the fact that, in certain example embodiments and modes, the system information (SI) is classified into plural categories or types, the system information (SI) generator 54 is depicted in FIG. 1 as comprising SIB type classifier 60 which defines the plural categories or types of system information, and may further define an association between the plural types and respective system information blocks. For sake of example two representative categories or types of system information (SI) are shown as defined by the SIB type classifier 60 in FIG. 1: a first type of system information (1TYP SIB) and a second type of system information (2TYP SIB). Definitions and procedures for handling for the first type of system information (1TYP SIB) and the second type of system information (2TYP SIB) may be selectively configured and maintained, and are accordingly reflected by 1TYPSIB controller 62 and 2TYPSIB controller 64, respectively.

In an example embodiment and mode, the first type of system information (1TYP SIB) is SIB "essential system information", which means system information (SI) which is essential to or minimally required by the wireless terminal 26 for initial access to the radio access network and to radio interface 24 in particular. Essential system information may be also referred as "minimum system information". On the other hand, in the same example embodiment and mode, the second type of system information (2TYP SIB) is non-essential system information (SI). "Non-essential" system information (SI) is defined as all other types of information, and thus excludes the minimal information required for initial access. Non-essential system information may be also referred as "other system information". As such the second type of system information (2TYP SIB) may facilitate utilization of certain features or services provided by or through radio access node 22. Thus, the first type system information comprises information which is periodically broadcasted by the transmitter and which is required for initial access to the radio access network, but the second type system information is not required for initial access to the radio access network.

In example embodiments and modes described herein, the radio access node 22 separately delivers the different types of system information, e.g., delivers the second type of system information (2TYP SIB) separately from the first type of system information (1TYP SIB). Accordingly, in an example embodiment and mode, the system information (SI) generator 54 further comprises SIB delivery controller 66 which, among other things, may implement the "differentiated" delivery of the second type of system information (2TYP SIB) apart from the first type of system information (1TYP SIB).

Figure 2:
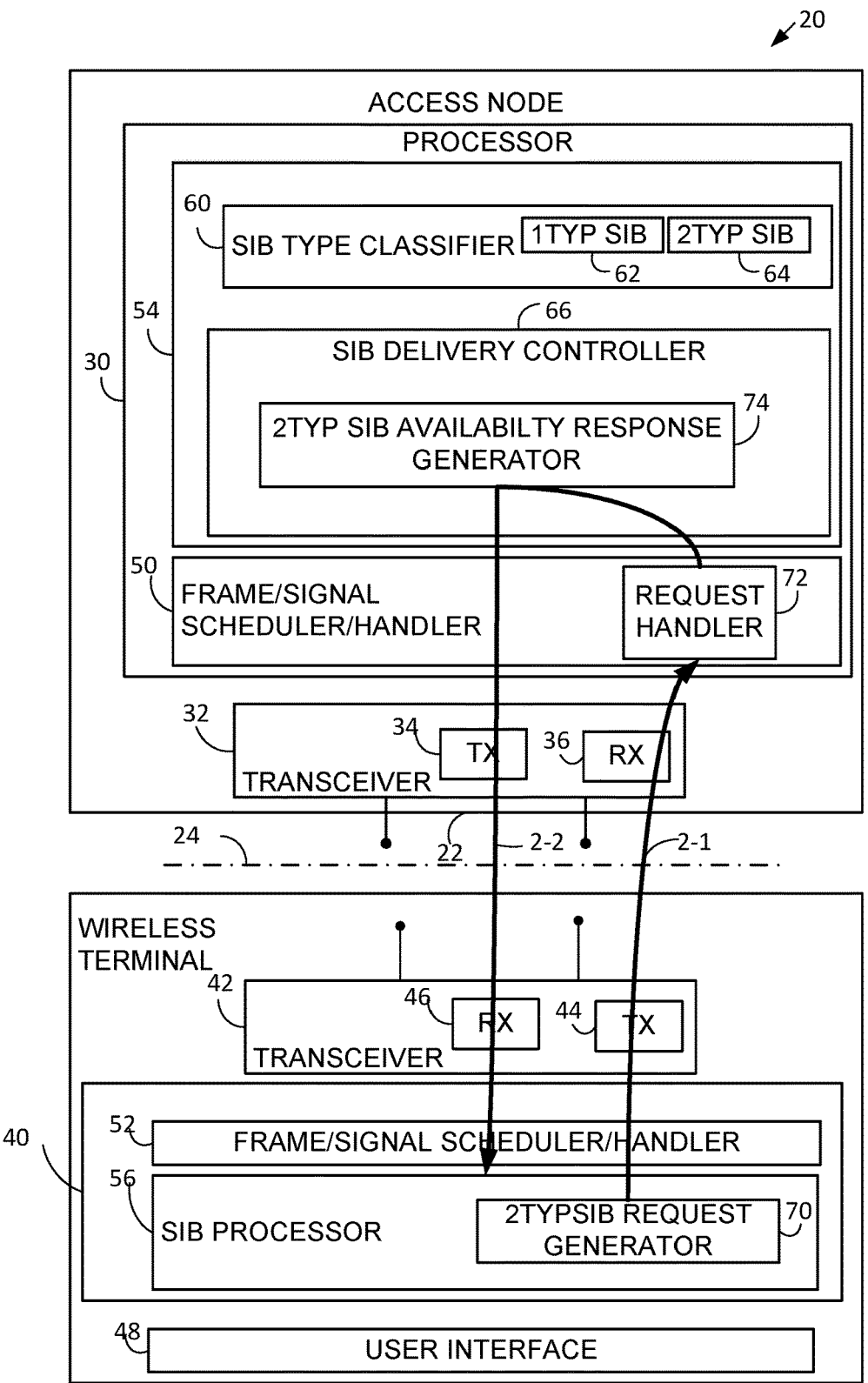
FIG. 2 is a schematic view showing an example communications system comprising a radio access node and a wireless terminal, and wherein the radio access node provides differentiated, on-demand delivery of second type of system information upon request by the wireless terminal.

FIG. 2 illustrates an example embodiment and mode in which, after obtaining initial access to the communications system 20 upon receiving the first type of system information (1TYP SIB), the wireless terminal 26 recognizes or appreciates that the wireless terminal 26 needs the second type of system information (2TYP SIB) and makes a special request for the second type of system information (2TYP SIB). The FIG. 2 embodiment and mode is thus an example of the radio access node 22 providing second type system information "on demand" Such request or demand for second type of system information (2TYP SIB) may arise, for example, when the wireless terminal 26 seeks to utilize a certain service provided by the communications system 20 or a functionality of wireless terminal 26 which, although not required for access, may enhance operation of wireless terminal 26. Accordingly, FIG. 2 shows the SIB processor 56 of wireless terminal 26 as comprising 2TYPSIB request generator 70, which generates a 2TYPSIB request depicted by arrow 2-1. FIG. 2 further shows node frame/signal scheduler/handler 50 as comprising 2TYPSIB request handler 72, and further shows the SIB delivery controller 66 as comprising 2TYPSIB availability response generator 74. Upon detection of the 2TYPSIB request by request handler 72, 2TYPSIB availability response generator 74 generates a 2TYPSIB availability response, depicted by arrow 2-2. The 2TYPSIB availability response comprises certain 2TYPSIB availability information, as described herein. The 2TYPSIB availability information includes information concerning availability of at least one block of the second type system information.

Figure 3:
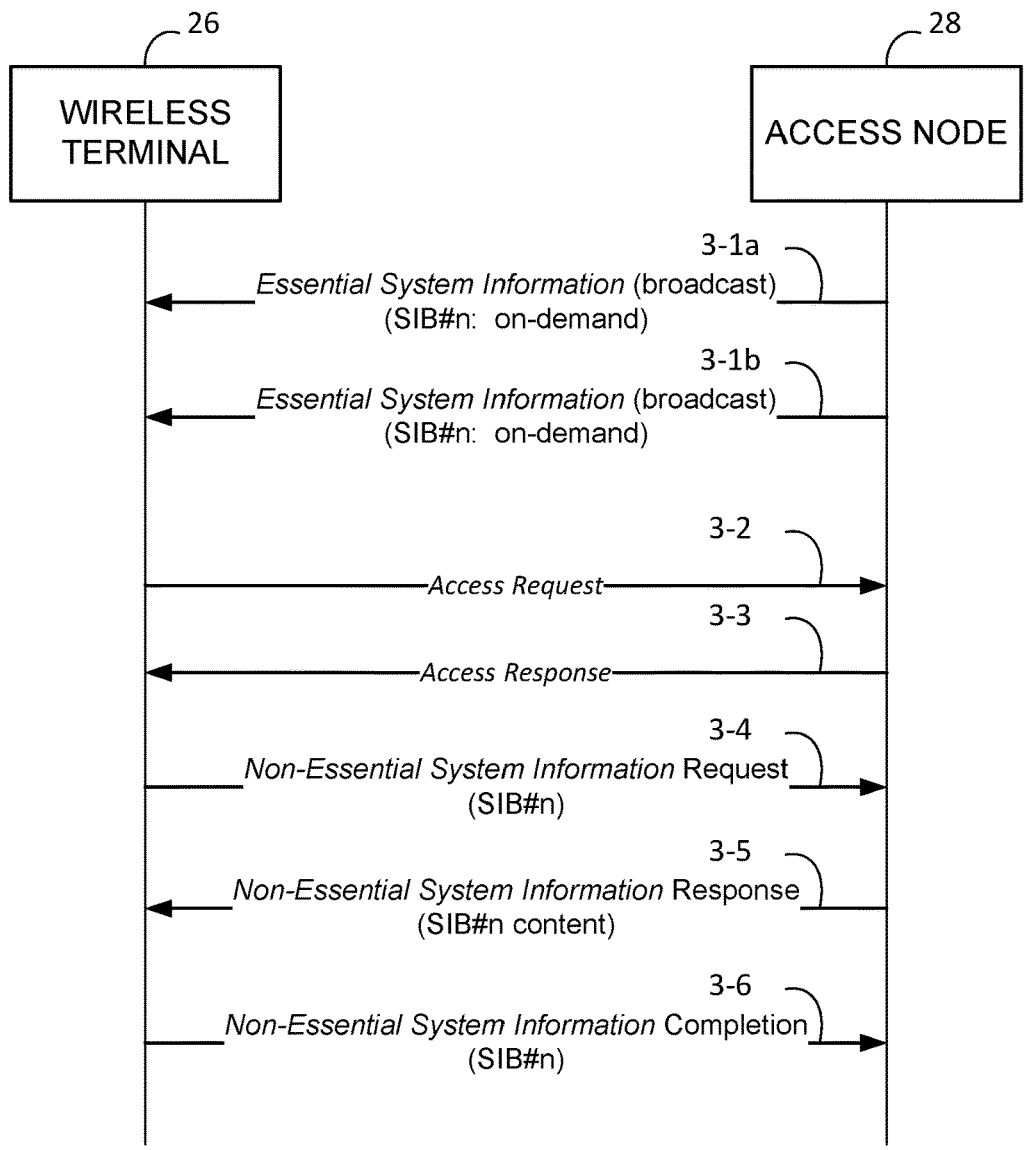
FIG. 3 is a diagrammatic view showing example message flow for the example communications system of FIG. 2.

The radio access node 22 and wireless terminal 26 of FIG. 2 operate essentially in the manner depicted in FIG. 3. FIG. 3 shows an exemplary message flow for an example embodiment, in which the wireless terminal 26 entering the coverage area of the radio access node 22 first receives Essential System Information (i.e., first type of system information (1TYP SIB), and in particular receives Essential System Information periodically broadcasted in messages containing the essential SIB(s) as information elements. The periodic broadcast of the Essential System Information is shown by messages 3-1a and 3-1b of FIG. 3, it being understood that there may be more than two such broadcast messages. Upon receiving the Essential System Information, i.e., the first type of system information (1TYP SIB), the wireless terminal 26 initiates the system access procedure by sending an Access Request message 3-2, which is acknowledged by radio access node 22 with an Access Response message 3-3. Following the system access procedure (comprised of the acts just described), the wireless terminal 26 sends a Non-essential System Information Request message 3-4 to radio access node 22. The Non-essential System Information Request message 3-4 may be generated by 2TYP SIG request generator 70 of FIG. 2, and may include an indication of one or more pieces of second type of system information (2TYP SIB), e.g., one or more SIB numbers (SIB#), that the wireless terminal 26 desires. Such indication of desired SIB# may be expressed in an information element of the Non-essential System Information Request message 3-4. The Non-essential System Information Request message 3-4 may be sent using uplink dedicated resources (e.g., radio resources of a frame). In the embodiment and mode of FIG. 2, the Non-essential System Information Request message 3-4 is thus distinct from an Access Request message.

In response to the Non-essential System Information Request message 3-4, the radio access node 22 may send Non-essential System Information Response message 3-5 using the downlink dedicated resources. The Non-essential System Information Response message 3-5 comprises the requested SIB#n (e.g., the SIB#n requested by the wireless terminal 26). The requested SIB#n may be included in an information element of the Non-essential System Information Response message 3-5. Afterwards, when the wireless terminal 26 has successfully obtained the requested SIB#n from the Non-essential System Information Response message 3-5, the wireless terminal 26 may send to the radio access node 22 a Non-essential System Information Completion message 3-6, at which point the radio access node 22 may release the uplink/downlink dedicated resources. Alternatively, the radio access node 22 may release the uplink/downlink dedicated resources after sending Non-essential System Information Response message 3-5.

Figure 4:
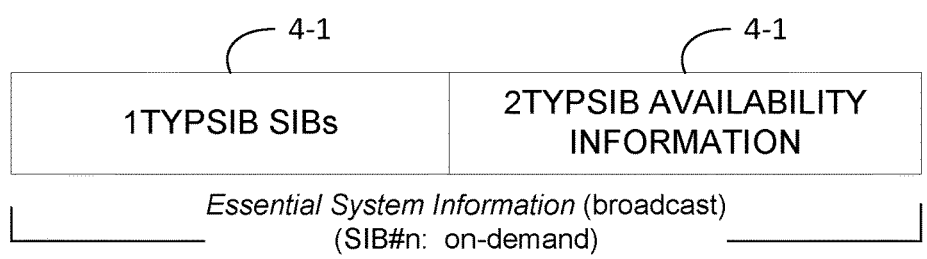
FIG. 4 is a diagrammatic view showing an example format of an Essential System Information message according to an example implementation of the system of FIG. 3.

In an example implementation of the FIG. 3 embodiment and mode, one or more of the Essential System Information messages 3-1a and 3-1b of FIG. 3 may include an information element specifying what non-essential SIBs (e.g., second type of system information (2TYP SIB) SIBs) are available at this radio access node 22 by request. For example, FIG. 4 shows that an Essential System Information message 3-1 may comprise plural parts (e.g., fields, information elements, or segments), including a first part 4-1 which expresses the first type of system information (1TYP SIB) SIBs, and a second part 4-2 which comprises or expresses availability of second type of system information (2TYP SIB). The second part 4-2 of the Essential System Information message 3-1 of FIG. 4 thus may indicate one or more second type of system information (SI) blocks that are available from the radio access node 22 upon request. Thus the Essential System Information message 3-1 may include an indication, in a transmission of the first type system information, that the second type system information is available upon request. In an example implementation the information concerning availability of the at least one block of second type system information does not include the content per se of the second type system information.

As an example illustration or implementation of FIG. 4, one or more of the Essential System Information messages 3-1 may include a k-bit sequence, and each of the k bits corresponds to the k-th non-essential SIB, where "0"/"1" may indicate that the radio access node 22 does not support/ supports on-demand based transmission of the k-th non-essential SIB, respectively. If the information element is not present in the message, or if the information element is present but no available non-essential SIBs are included, the wireless terminal 26 may assume that all the SIBs from this radio access node 22 are essential SIBs. As an example, SIB#n may be such a non-essential SIB the wireless terminal 26 desires to obtain (optionally, wireless terminal 26 may request multiple non-essential SIB s). Upon receiving such an Essential System Information message 3-1, the SIB processor 56 of wireless terminal 26 may direct its request handler 72 to send the Non-essential System Information Request message 3-4, and therein specify that SIB#n is the requested second type SIB. As mentioned above, the Non-essential System Information Request message 3-4 may be transmitted using uplink dedicated resources.

Thus, as understood from above, the information concerning availability of the at least one block of second type information comprises a k-bit sequence corresponding to k number of blocks of second type system information. A first value for a bit of the k-bit sequence indicates availability of the corresponding block of second type system information and a second value for a bit of the k-bit sequence indicates unavailability of the corresponding block of second type system information. The node processor 30 is configured to determine from, the request message 2-1 received by the node receiver 36 from the wireless terminal 26, a $n^{th}$ block of the k number of blocks of the second type system information requested by the wireless terminal 26. In response to the request message 2-1, the node processor 30 is configured to schedule transmission by the node transmitter 34 of the $n^{th}$ block of the second type system information. The node processor 30 may schedule transmission of the $n^{th}$ block of the second type system information using dedicated downlink resources or broadcast resources.

Figure 5:
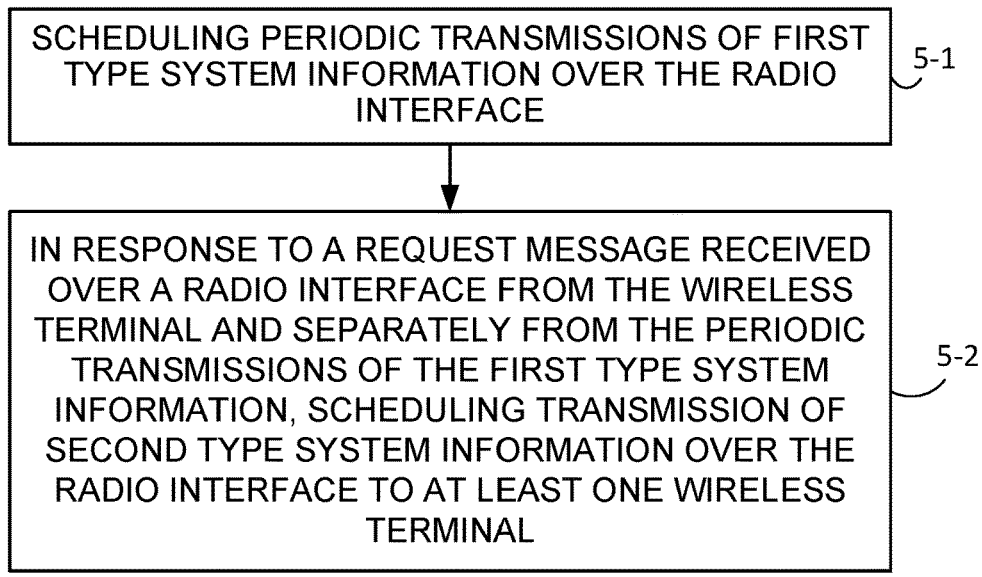
FIG. 5 is a flowchart showing example basic acts or steps that may be performed by the radio access node of the example system of FIG. 2.

FIG. 5 shows example basic acts or steps that may be performed by the radio access node of the example system of FIG. 2. The acts of FIG. 5 may be performed by node processor 30, and particularly by SIB delivery controller 66 of differentiated delivery SIB generator 54. Act 5-1 comprises scheduling periodic transmissions of first type system information over the radio interface (such as the messages 3-1 of FIG. 3, for example). Act 5-2 is performed in response to a request message received over a radio interface from the wireless terminal and is performed separately from the periodic transmissions of the first type system information. Such a request message may be the Non-essential System Information Request message 3-4 of FIG. 3, for example. Act 5-2 comprises scheduling transmission of second type system information over the radio interface to at least one wireless terminal, e.g., the requesting wireless terminal 26.

Figure 6:
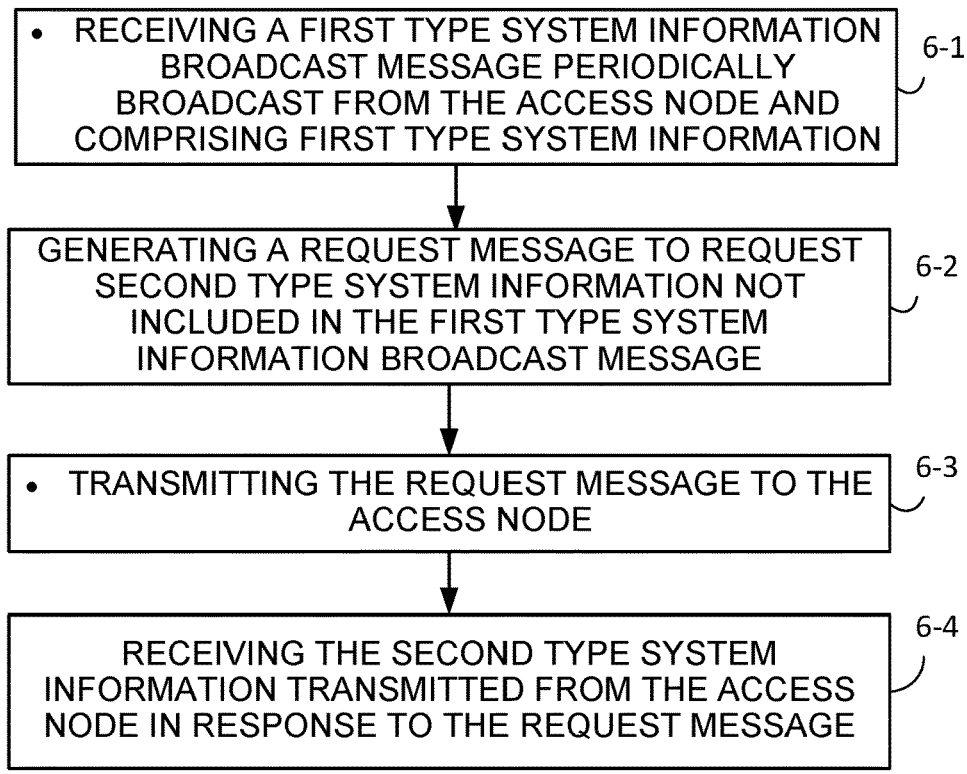
FIG. 6 is a flowchart showing example basic acts or steps that may be performed by the wireless terminal of the example system of FIG. 2.

FIG. 6 shows example basic acts or steps that may be performed by the wireless terminal of the example system of FIG. 3. Act 6-1 comprises receiving a first type system information broadcast message periodically broadcast from the access node and comprising first type system information. The message of act 6-1 may be received by terminal receiver 46, and may be a message such as one or more of the Essential System Information messages 3-1*a* and 3-1*b* of FIG. 3, for example. Act 6-2 comprises generating a request message to request second type system information not included in the first type system information broadcast message. The request message of act 6-2 may be generated by 2TYP SIG request generator 70. Act 6-3 comprises transmitting the request message to the access node. The request message of act 6-3 may be transmitted by terminal transmitter 44, and may be a message such as Non-essential System Information Request message 3-4 of FIG. 3, as depicted also by arrow 2-1 in FIG. 2. Act 6-4 comprises receiving the second type system information transmitted from the access node in response to the request message. The second type system information may be the Non-essential System Information Response message 3-5 of FIG. 3, also depicted as response message 2-2 in FIG. 2.

Figure 7:
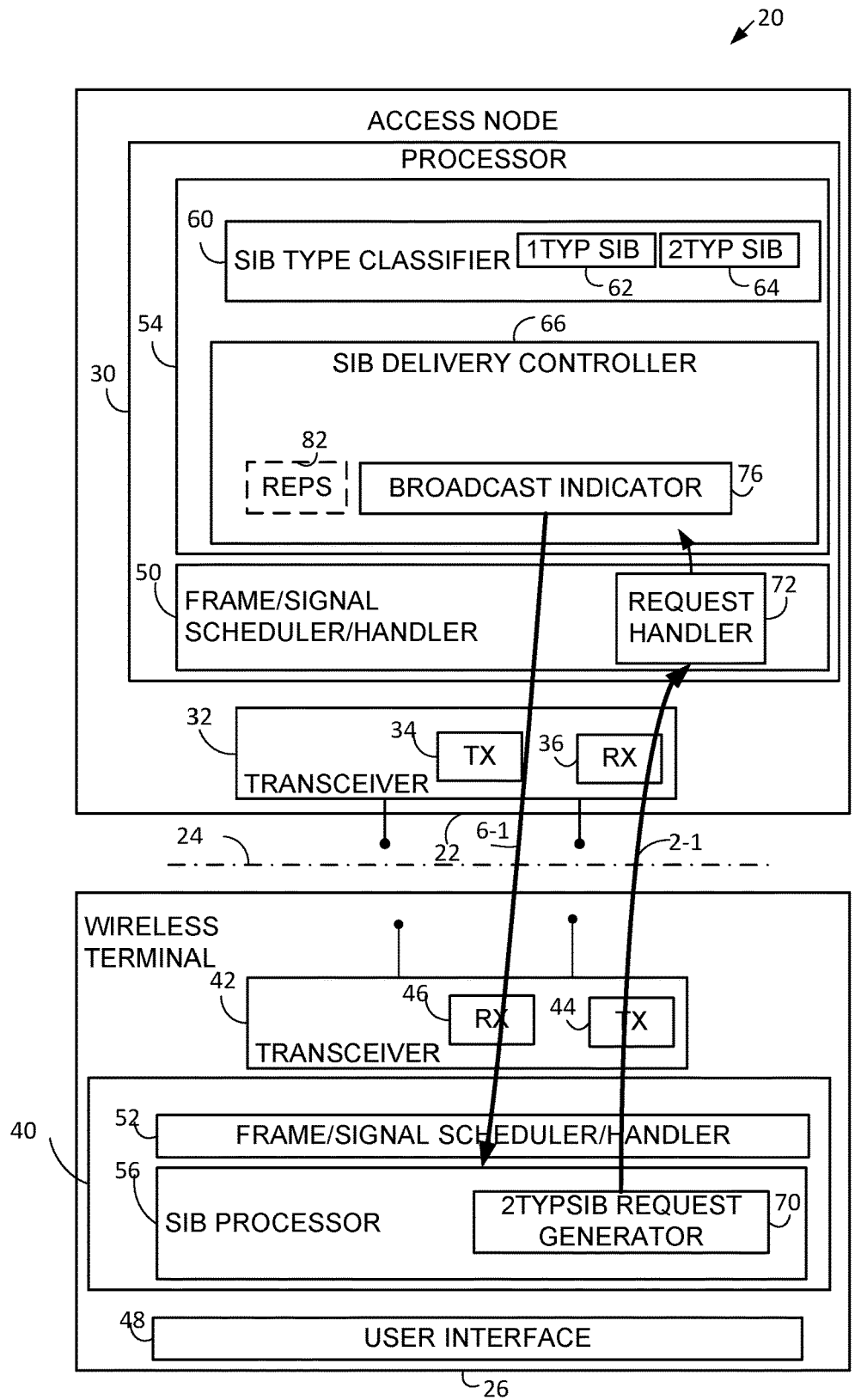
FIG. 7 is a schematic view showing an example communications system comprising a radio access node and a wireless terminal, and wherein the radio access node provides differentiated delivery of second type of system information by broadcast of second type system information which is separate from broadcast of first type system information.

In another example embodiment and mode illustrated in FIG. 7, the node processor 30 of radio access node 22 responds to a request for second type system information by advising the wireless terminal that the requested second type system information will be broadcast. The SIB delivery controller 66 of FIG. 7 includes broadcast indicator information element generator 76. The broadcast indicator information element generator 76 serves to include in response message 6-1 (which is responsive to the request message 2-1) a broadcast information element (which is shown as broadcast information element 78 in FIG. 8) that indicates that the requested second type SIB#n will be broadcasted (instead of unicasted as occurred in the scenario of FIG. 3).

Figure 8:
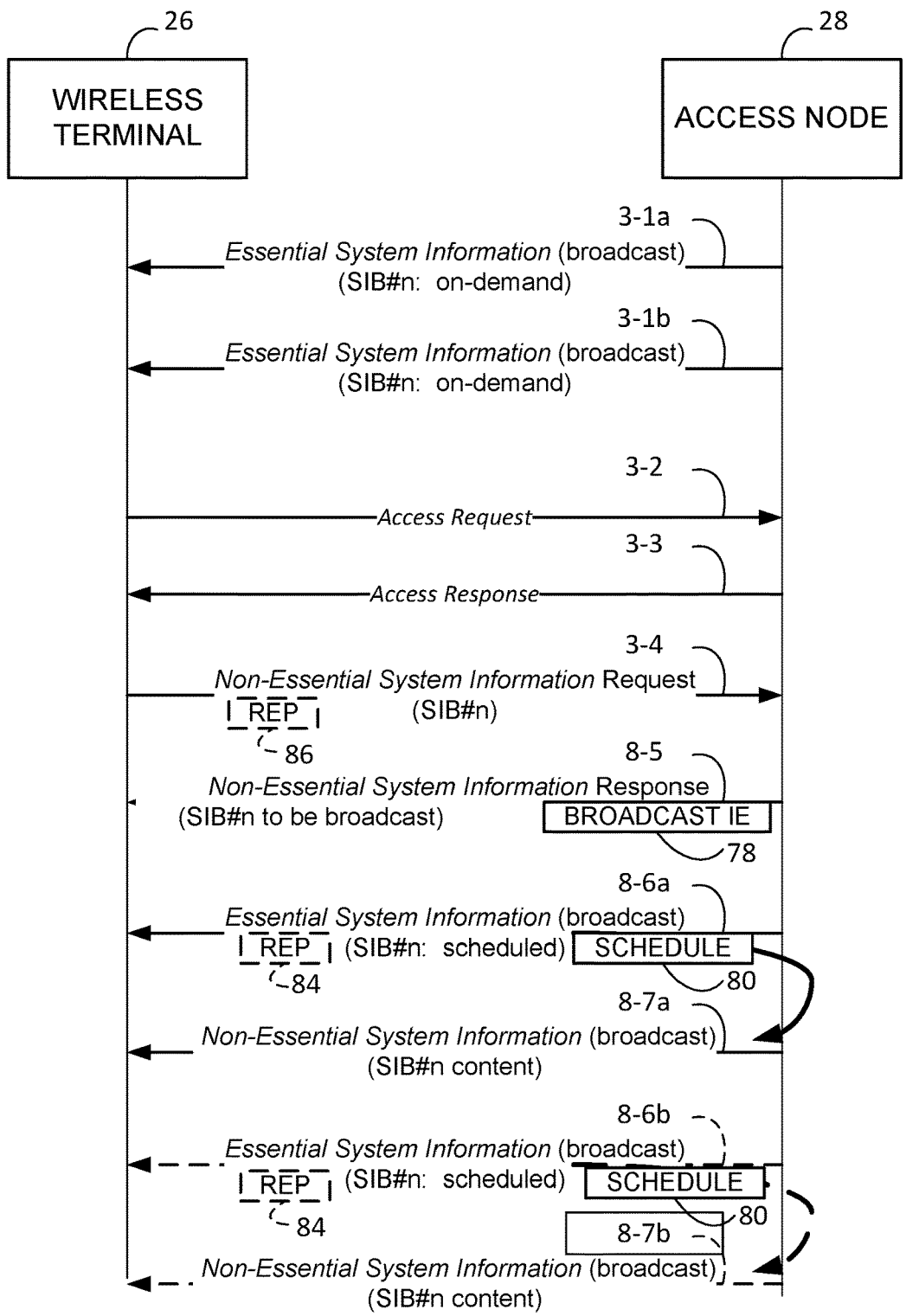
FIG. 8 is a diagrammatic view showing example message flow for the example communications system of FIG. 7.

FIG. 8 illustrates basic messages of the example embodiment and mode of FIG. 7. Messages 3-1 through 3-4 of FIG. 8 are essentially the same as correspondingly numbered messages of FIG. 3. The Non-essential System Information Response message 8-5 of FIG. 8, however, which follows message 3-4 in FIG. 8, includes the just-mentioned information element 78 which indicates that the requested second type SIB#n will be broadcasted. Then the radio access node 22, in at least one Essential System Information message transmission afterwards, starts including at least one information element 80 for the schedule of SIB#n transmissions. For example, the radio access node 22 includes scheduling information (which advises of the scheduling of the broadcast of the requested second type SIB) in Essential System Information message 8-6*a* of FIG. 8. The scheduling information 80 in Essential System Information message 8-6*a* points to the broadcast message (such as Non-Essential System Information message 8-7*a*) in which the requested second type SIB is included. That is, based on this schedule information 80 transmitted in the Essential System Information message 8-6*a*, the radio access node 22 broadcasts the Non-essential System Information message 8-7*a* containing the requested SIB#n.

The radio access node 22 may optionally repeat the two acts (e.g., as messages 8-6*b* and 8-7*b* shown in FIG. 8) multiple times for reliable delivery. By receiving at least one of these repetitions, hopefully the wireless terminal 26 successfully obtains the SIB#n. The number of the repetitions ("reps") may be determined by the radio access node 22. For example, the number of repetitions ("reps") may be configured by SIB delivery controller 66, as indicated by optional repetition factor 82. Information indicating the number may be broadcasted together with the essential system information, as depicted by optional repetition information element 84.

Alternatively, the number of the repetitions may be determined by the wireless terminal 26 and may be notified to the radio access node 22 through the Non-essential System Information Request message, as optionally depicted by repetition request factor 86 in Non-essential System Information Request message 3-4 of FIG. 8. In this mode, the node receiver 36 is configured to receive over the radio interface the plural number (the requested number of repetitions) for the plural number of broadcast messages.

Thus, as understood from FIG. 8 and the foregoing, in accordance with the scheduling information the radio access node 22 may be configured to transmit at least one block of the second type system information second type system information in a plural number of broadcast messages. For example, the radio access node 22 may (1) broadcast the scheduling information (e.g., scheduling information 80) for the second type system information second type system information; (2) in accordance with the scheduling information, to include the second type system information in a broadcast message other than a periodic broadcast of the first type system information; and (3) repeat (1) and (2) a plural number of times.

A benefit of the example embodiment and mode of FIG. 8 is that the requested SIB#n can be also received by other wireless terminals entering the same coverage area. Such other wireless terminals may receive the Essential System Information message and know that the SIB#n is scheduled to be transmitted. As a result, the number of transmissions for Non-essential System Information Request message may be reduced.

Figure 9:
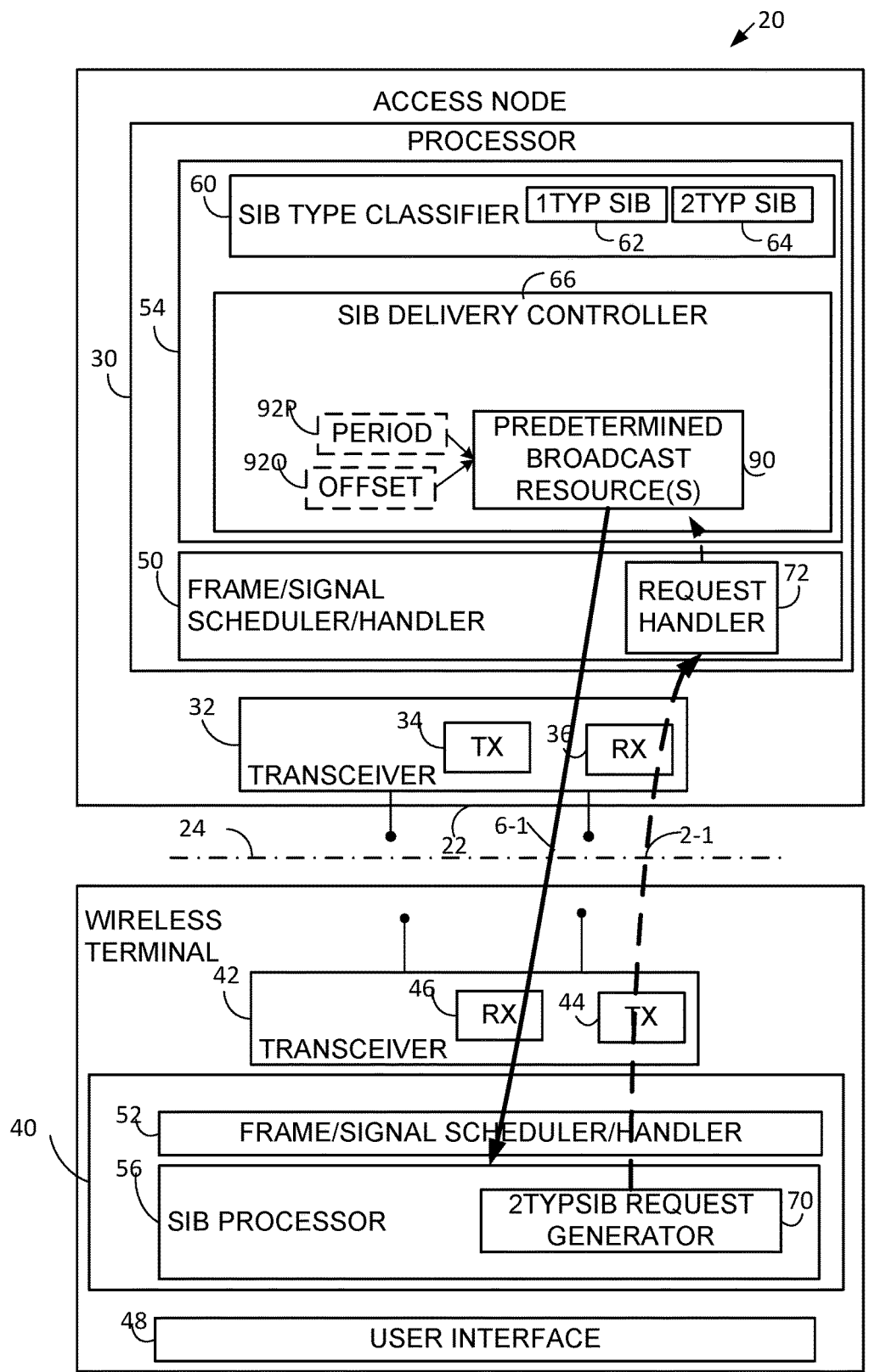
FIG. 9 is a schematic view showing an example communications system comprising a radio access node and a wireless terminal, and wherein the radio access node provides differentiated delivery of second type of system information by broadcast of second type system information which is separate from broadcast of first type system information, and wherein the broadcast of second type system information uses predetermined radio resource(s).

FIG. 9 shows another example embodiment and mode of communications system 20, which is a variation of the example embodiment and mode of FIG. 7. In the FIG. 9 example embodiment and mode, the broadcasts of SIB#n in the Non-essential System Information message occur on pre-determined radio resource(s) allocations. Preferably the predetermined radio resource does not carry the first type system information. In this regard FIG. 9 shows SIB delivery controller 66 as comprising predetermined broadcast resource(s) sub-controller 90, which maintains the description of predetermined broadcast resource(s) which the SIB delivery controller 66 may use for transmitting the second type system information (SI). The SIB delivery controller 66 may further comprise various optional input sources 92 for use by predetermined broadcast resource(s) sub-controller 90. For example, the pre-determined resource allocations may be defined by using a periodicity and/or an offset, as reflected by periodicity input source 92P and offset input source 92O, respectively. An example of this periodicity is that the transmission occasion of second type of system information (2TYP SIB) happens in every 80 ms or 8 frames. An offset is defined from a well-known reference timing defined in the radio interface, such as a radio frame boundary, for example.

The radio access node 22 may optionally repeat sending Non-essential System Information message at multiple occasions. The wireless terminal that has sent the Non-essential System Information Request message which requests SIB#n may receive Non-essential System Information on at least one pre-determined radio resource allocation, without receiving an Essential System Information message. Moreover, the radio access node 22 may use these allocated resources for other purposes if it does not transmit SIB#n.

Figure 10:
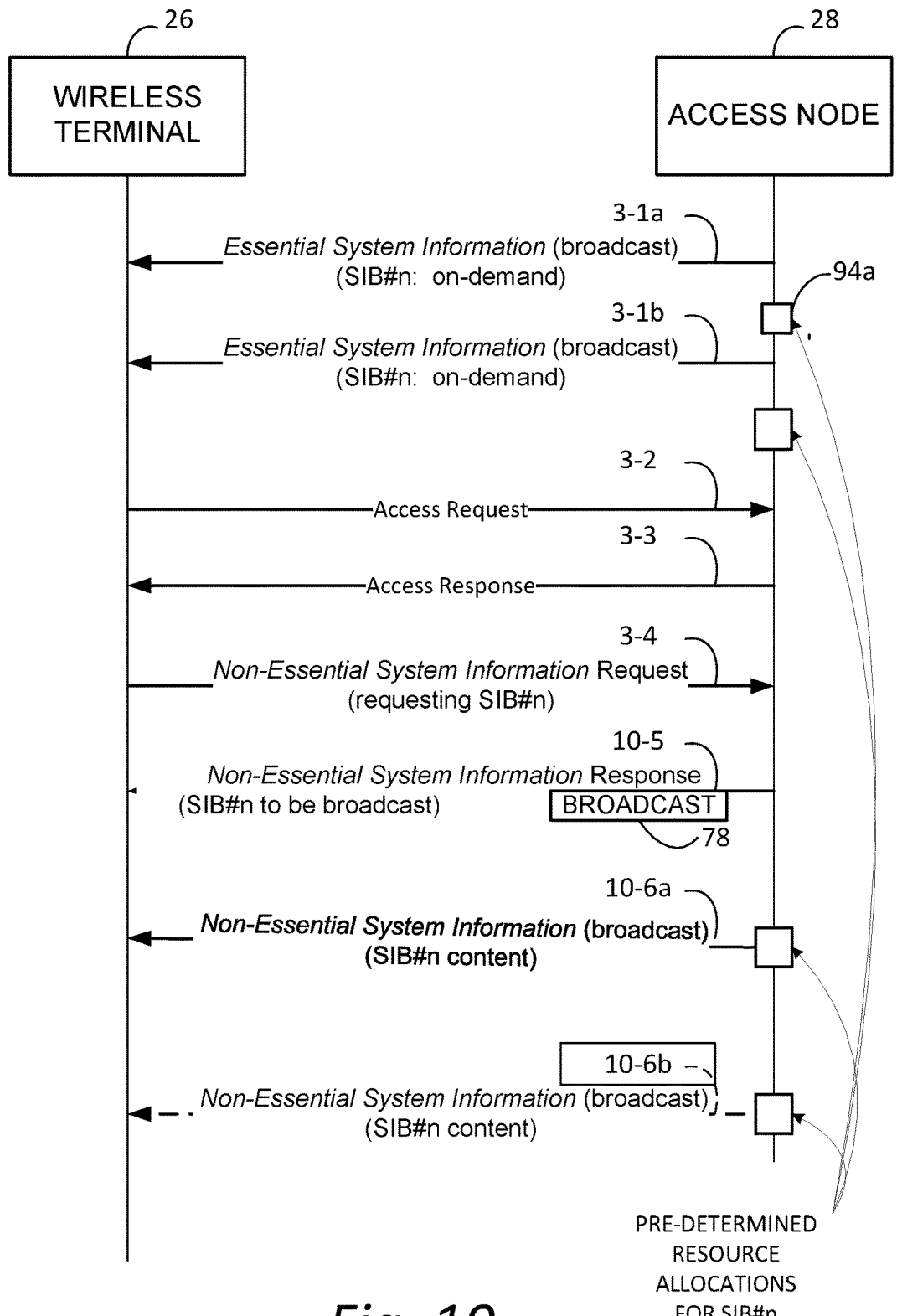
FIG. 10 is a diagrammatic view showing example message flow for the example communications system of FIG. 9.

FIG. 10 illustrates basic messages of the example embodiment and mode of FIG. 9. The message flow of FIG. 10 is similar to the message flow of FIG. 8, except that in FIG. 10 the use of predetermined radio resources eliminates the need for access node 22 to send Essential System Information messages that advise of the scheduling of the Non-Essential System Information broadcasts. The wireless terminal 26 may optionally repeat sending Non-essential System Information message at multiple occasions. The wireless terminal that has sent Non-essential System Information Request message requesting SIB#n may receive Non-essential System Information on at least one pre-determined radio resource allocation, without receiving Essential System Information message. The wireless terminal 26 may use these allocated resources for other purposes if it does not transmit SIB#n.

As understood from FIG. 10, any other wireless terminal entering the coverage first receives one or more Essential System Information messages, such as Essential System Information messages 3-1a and 3-1b. After receiving one or more of the Essential System Information messages 3-1a and 3-1b, such other wireless terminal may monitor pre-determined resources 94 for one or more times before determining whether it is necessary to send a request message. For example, after receiving the Essential System Information message 3-1a, the wireless terminal may monitor the predetermined resource 94a for the second type system information (SI). Alternatively or additionally, second type system information (SI) may be obtained from predetermined resource 94b. The number of monitoring trials may be predetermined, or may be configured by the Essential System Information message.

If such other wireless terminal is able to obtain the desired second type of system information (SI), e.g., SIB#n, then there is no need for the wireless terminal 26 to send the request message 2-1. On the other hand, if after access to the system, for any reason such other wireless terminal has not been able to obtain its desired second type of system information (SI), e.g., SIB#n, from the pre-determined resources 94, the 2TYP SIG request generator 70 of the other wireless terminal sends the request message, e.g., the Non-essential System Information Request message 3-4 to radio access node 22, requesting the desired SIB#n. Thereafter the radio access node 22 sends its response message (e.g., Non-essential System Information Response message 10-5), to such other wireless terminal. The Non-essential System Information Response message 10-5 indicates that the SIB#n will be broadcast. Since the broadcast of the SIB#n is to occur on predetermined radio resources(s), the wireless terminal knows how to obtain the Non-Essential System Information messages 10-6 which are broadcast on those predetermined resources and which include the requested SIB#n.

Figure 11:
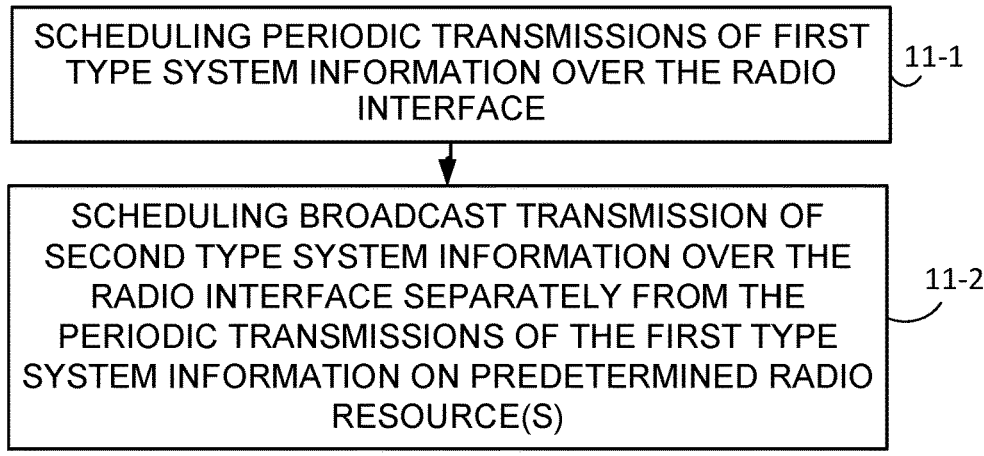
FIG. 11 is a flowchart showing example basic acts or steps that may be performed by the radio access node of the example system of FIG. 9.

FIG. 11 shows example basic acts or steps that may be performed by the radio access node 22 of the example system of FIG. 9. The acts of FIG. 11 may be performed by the node processor 30. Act 11-1 comprises scheduling periodic transmissions of first type system information over the radio interface. Act 11-2 comprises scheduling broadcast transmission, using predetermined radio resource(s), of second type system information over the radio interface separately from the periodic transmissions of the first type system information.

Figure 12:
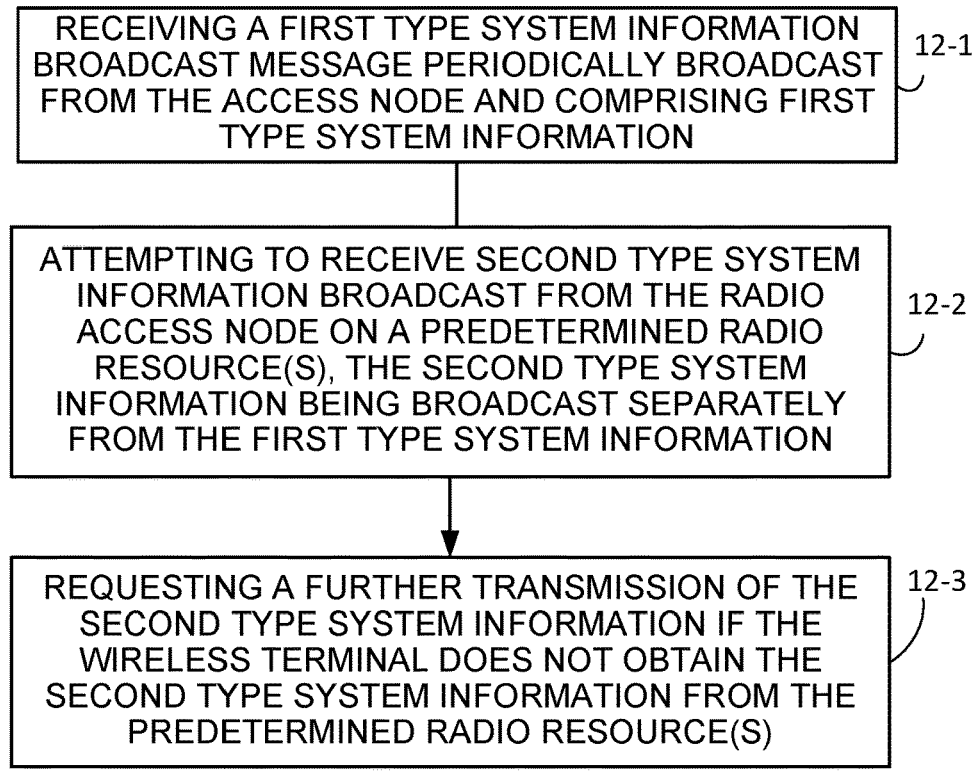
FIG. 12 is a flowchart showing example basic acts or steps that may be performed by the wireless terminal of the example system of FIG. 9.

FIG. 12 shows example basic acts or steps that may be performed by the "another" wireless terminal of the example system of FIG. 9. The acts of FIG. 12 may be performed by the terminal processor of such other wireless terminal. Act 12-1 comprises the terminal receiver 46 receiving a first type system information broadcast message periodically broadcast from the access node and comprising first type system information. Act 12-2 comprises the other wireless terminal attempting to receive second type system information broadcast from the radio access node 22 on a predetermined radio resource(s), the second type system information being broadcast separately from the first type system information. In the context of FIG. 10, for example, the other wireless terminal attempts to receive second type system information broadcast on predetermined resources 94. Act 12-3 comprises requesting a further transmission of the second type system information if the other wireless terminal does not obtain the second type system information from the predetermined radio resource(s). For example, act 12-3 may comprise sending the request message indicated by arrow 2-2.

As is understood from the foregoing and FIG. 12, the terminal processor circuitry 30 of the another wireless terminal generates the request message after checking whether the terminal receiver has received the second type system information from the access node on predetermined resources. In an example implementation, the terminal processor circuitry is configured to generate the request message after making a predetermined number of checks whether the receiver has received the second type system information from the access node on predetermined resources. The predetermined number of checks may correspond to a predetermined number of broadcast transmissions by the access node 22 of the second type system information on the predetermined resources.

The example embodiment and mode of FIG. 9 and FIG. 10 thus may advantageously suppress unnecessary transmissions of Non-essential System Information Request message.

In addition, the pre-determined resource allocations may be configurable by including the information of allocations in the Essential System Information message. The predetermined resource allocations of a given non-essential SIB may be jointly coded with whether the non-essential SIB is available at this eNB by request (as may occur when the configured resource allocations comprise the 2TYPSIB availability information 4-1, for example). Alternatively, the pre-determined resource allocations may be tied to the SIB indices. That is, instead of including the resource allocation information in Essential System Information, the index of a SIB (e.g., n for SIB#n) may determine a particular resource allocation using a well-known formula.

Figure 13:
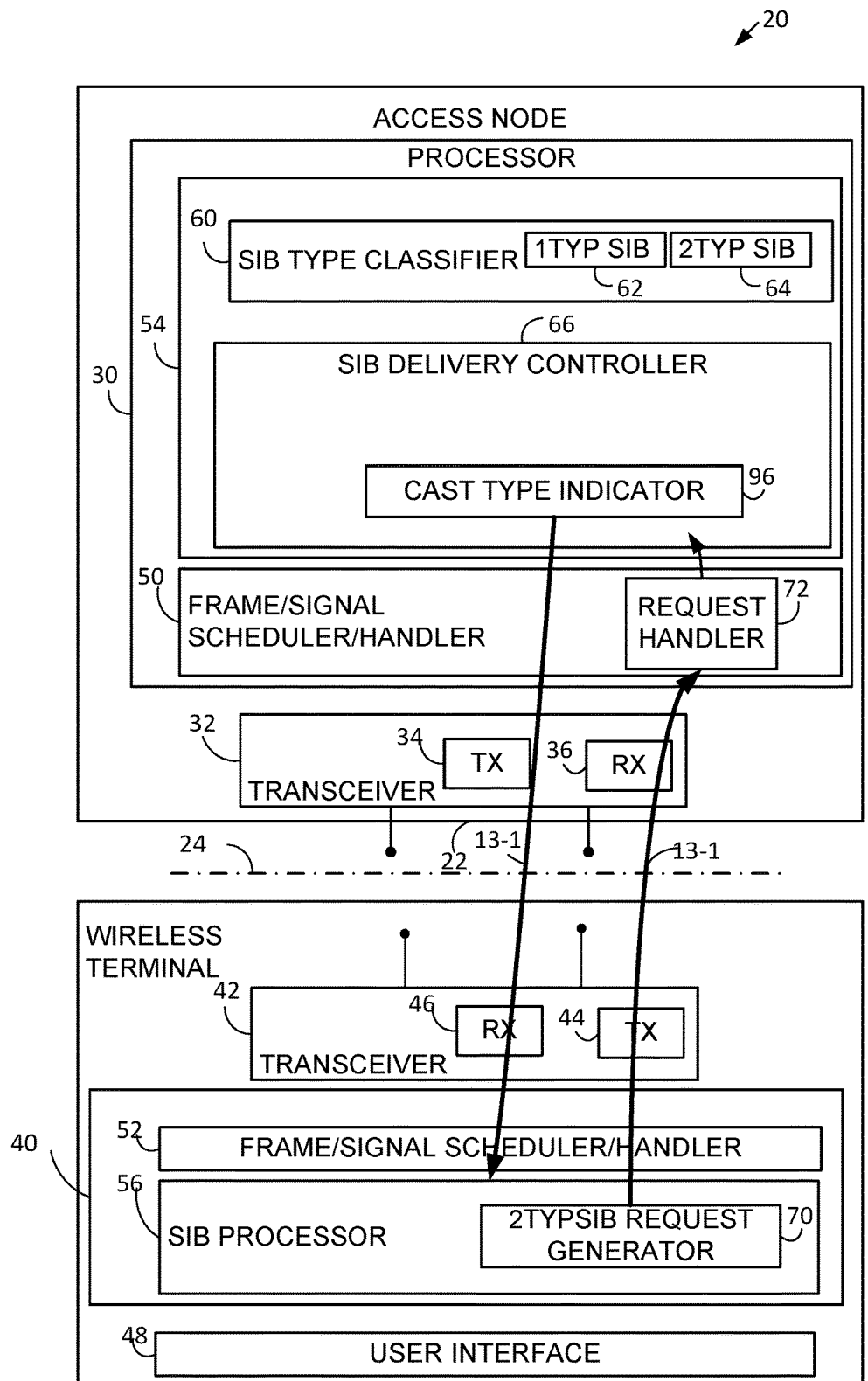
FIG. 13 is a schematic view showing an example communications system comprising a radio access node and a wireless terminal, and wherein the radio access node provides differentiated delivery of second type of system information upon receipt of an Access Request message, and wherein the radio access node determines whether to provide the second type system information by unicast or broadcast.

FIG. 13 shows another example embodiment and mode of communications system 20 in which an Access Request message contains a request for second type system information, e.g., for SIB#n. Thus, in the FIG. 13 embodiment and mode, a separate request message for the second type system information, such as the request message depicted by arrow 2-1 in FIG. 2, is not generated. The Access Request message is depicted by arrow 13-1 in FIG. 13, and may be generated by 2TYP SIG request generator 70. The Access Request message may include a request for a specific piece of system information, e.g., SIB#n.

In the FIG. 13 embodiment and mode, the radio access node 22 that receives the Access Request message may decide to deliver the SIB#n by unicast, or by broadcast. In this regard, the system information (SI) generator 54 of FIG. 13 includes cast type determination logic and includes in its response (to the Access Request message) a cast type indicator, as indicated by cast type indicator 96 shown in SIB delivery controller 66. In case of unicast, the radio access node 22 includes an information element of unicast indication 97 for SIB#n in Access Response message (the Access Response message being depicted by arrow 13-2 in FIG. 13). Otherwise, the radio access node 22 includes an information element of a broadcast indication 98 for SIB#n in the Access Response message.

Figure 14:
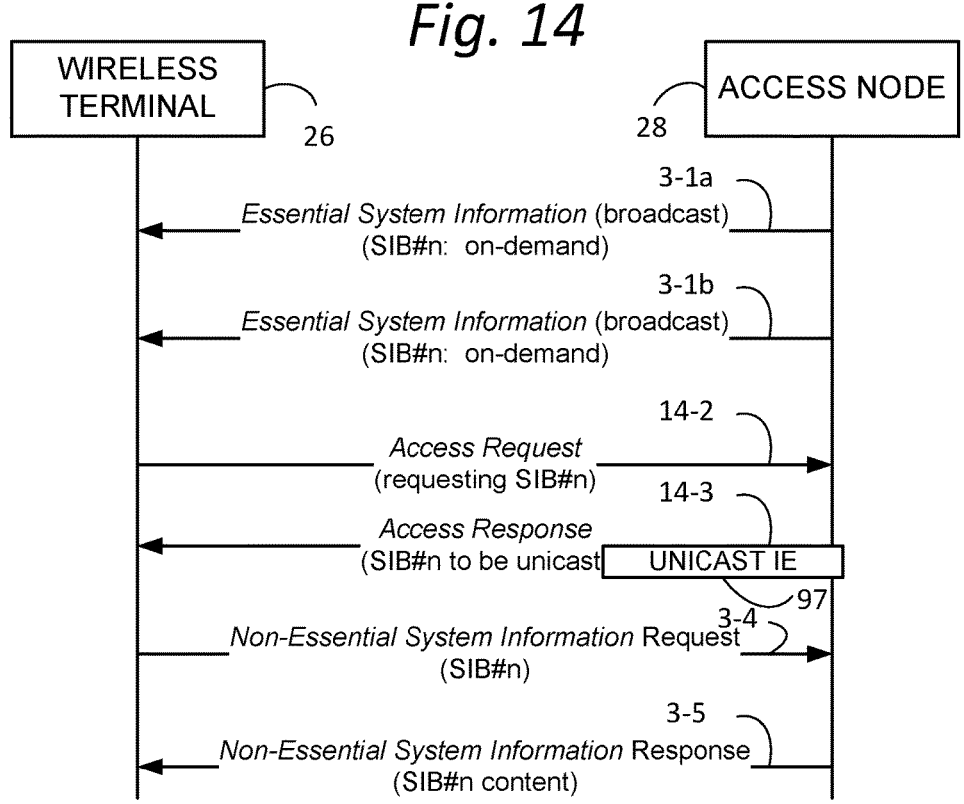
FIG. 14 is a diagrammatic view showing example message flow for the example communications system of FIG. 13 in a situation in which second type system information is provided by unicast.
Figure 15:
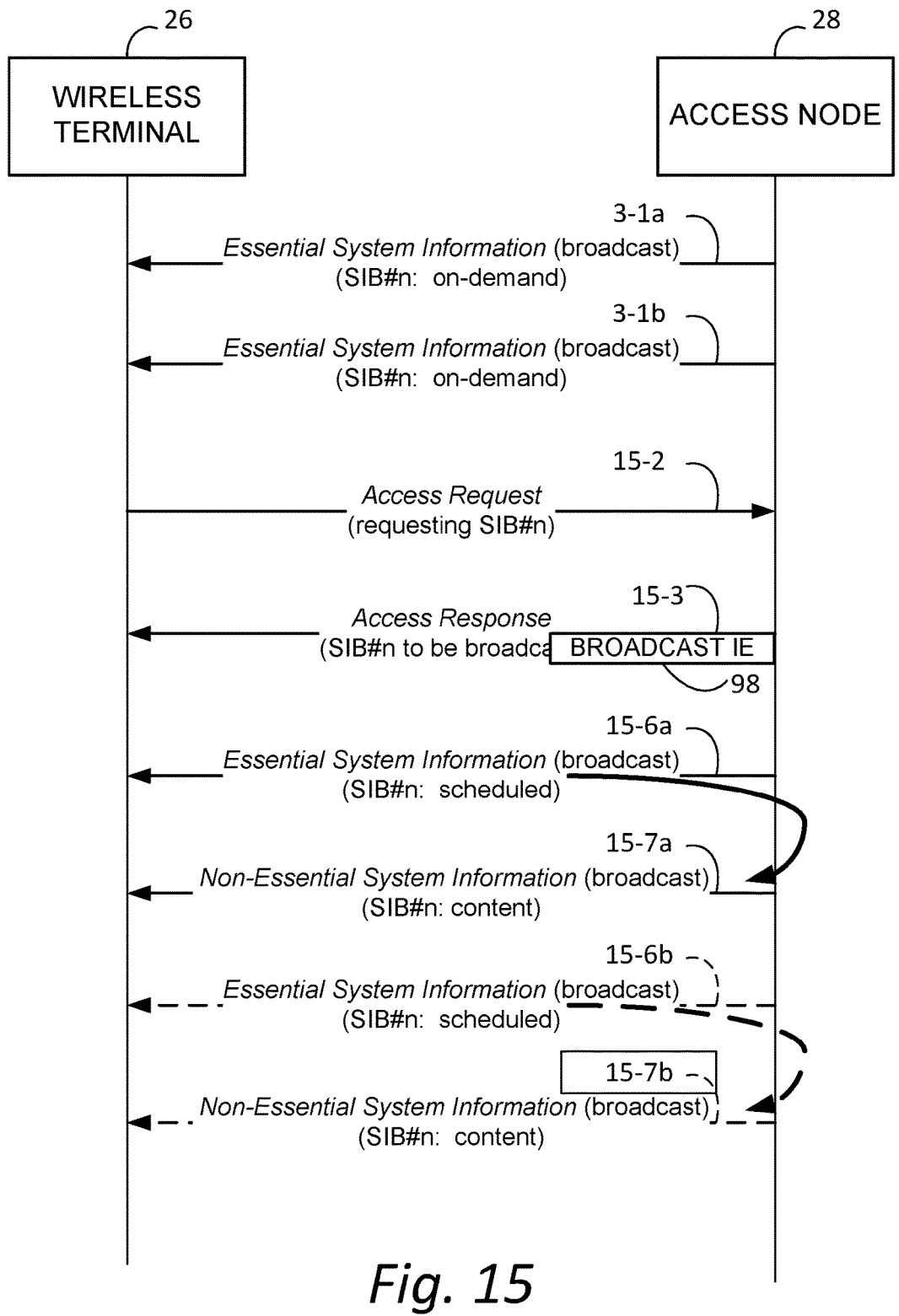
FIG. 15 is a diagrammatic view showing example message flow for the example communications system of FIG. 13 in a situation in which second type system information is provided by broadcast.

FIG. 14 and FIG. 15 show basic messages of the example embodiment and mode of FIG. 13. FIG. 14 particularly shows the Access Request message 14-2 as including a request for SIB#n, and also shows radio access node 22 including an information element of unicast indication 97 for SIB#n in Access Response message 14-3 in FIG. 14 for the case when unicast is decided. FIG. 15 particularly shows the Access Request message 15-2 as including a request for SIB#n, and also show the radio access node 22 including an information element of broadcast indication 98 for SIB#n in Access Response message 15-3 in FIG. 15 for the case when broadcast is decided.

Figure 16:
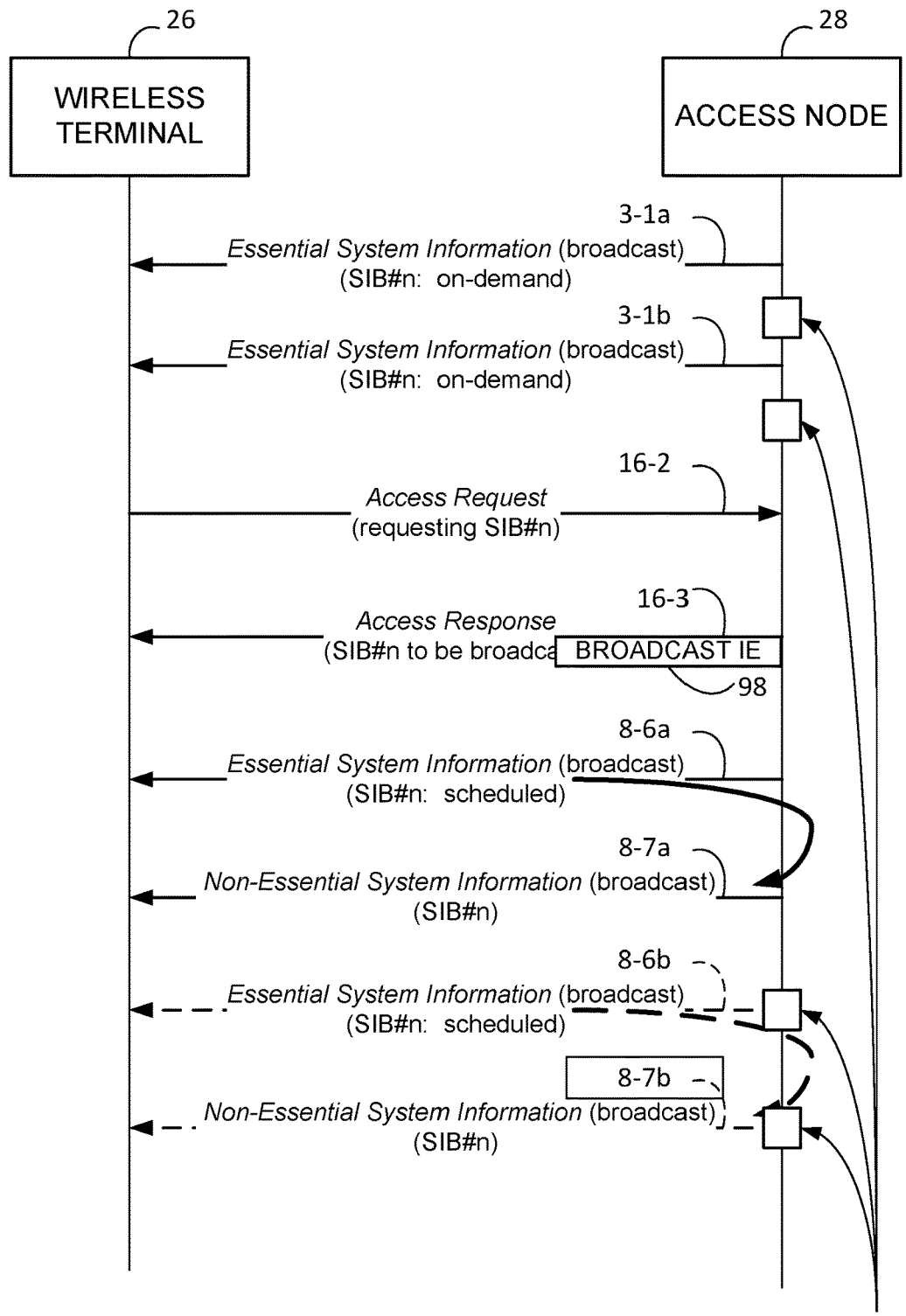
FIG. 16 is a diagrammatic view showing example message flow for the example communications system of FIG. 13 in a situation in which second type system information is provided by broadcast, and wherein Non-essential System Information message is broadcasted on pre-determined resource allocations

An alternative approach to FIG. 15 is shown in FIG. 16, where Non-essential System Information message is broadcasted on pre-determined resource allocations (e.g. resources pre-configured by eNB), as explained in another example embodiment and mode described above.

Figure 17:
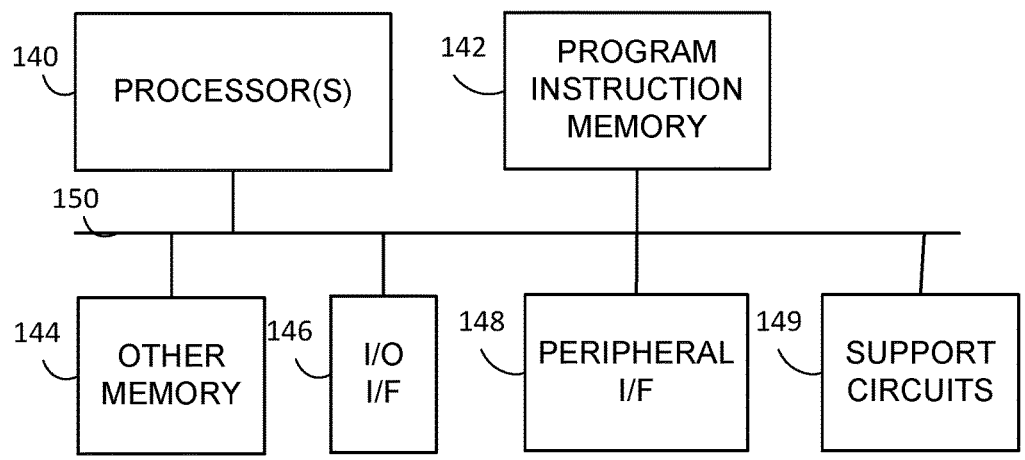
FIG. 17 is a diagrammatic view showing example electronic machinery and/or circuitry which may comprise a node processor and/or a terminal processor for the example embodiments described herein or encompassed hereby.

Certain units and functionalities of node 22 and wireless terminal 26 are, in example embodiments, implemented by electronic machinery, computer, and/or circuitry. For example, the node processors 30 and terminal processors 40 of the example embodiments herein described and/or encompassed may be comprised by the computer circuitry of FIG. 17. FIG. 17 shows an example of such electronic machinery or circuitry, whether node or terminal, as comprising one or more processor(s) circuits 140; program instruction memory 142; other memory 144 (e.g., RAM, cache, etc.); input/output interfaces 146; peripheral interfaces 148; support circuits 149; and busses 150 for communication between the aforementioned units.

The program instruction memory 142 may comprise coded instructions which, when executed by the processor(s), perform acts including but not limited to those described herein. Thus is understood that each of node processor 30 and terminal processor 40, for example, comprise memory in which non-transient instructions are stored for execution.

The memory 144, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 149 are coupled to the processors 140 for supporting the processor in a conventional manner. These circuits include cache, power supplies, clock circuits, input/output circuitry and subsystems, and the like.

The technology of this application thus encompasses but is not limited to the following example embodiments, example features, and example advantages:

Example Embodiment 1: A user equipment (UE) for receiving system information, comprising:
a processor; and
a memory in electronic communication with the processor, wherein instructions stored in the memory are executable to:
receive first system information periodically broadcasted from eNB;
determine types of second system information to additionally receive;
transmit to the eNB a request containing said types of the second system information; receive the requested second system information from the eNB.

Example Embodiment 2: The UE of Example Embodiment 1, wherein the UE receives the requested second system information unicasted to the UE.

Example Embodiment 3: The UE of Example Embodiment 1, wherein the requested second system information is broadcasted by the eNB.

Example Embodiment 4: The UE of Example Embodiment 2[00079], wherein the UE receives from the eNB an indication that the requested second system information will be sent by unicast.

Example Embodiment 5: The UE of Example Embodiment 3, wherein the UE receives from the eNB an indication that said requested second system information will be broadcasted.

Example Embodiment 6: The UE of Example Embodiment 4, wherein prior to receiving said requested second system information to be broadcasted the UE receives said first system information that specifies one or plurality of broadcast schedules for said requested second system information.

Example Embodiment 7: The UE of Example Embodiment 3, wherein the UE receives said requested second system information transmitted on pre-determined radio resources.

Example Embodiment 8: The UE of Example Embodiment 3, wherein the UE receives said requested second system information transmitted on radio resources configured by the eNB.

Example Embodiment 9: The UE of Example Embodiment 8, wherein said radio resource configuration is broadcasted by eNB.

Example Embodiment 10: The UE of Example Embodiment 3, wherein the UE requests the number of repetitive broadcasts for the said requested second system information.

Example Embodiment 11: An evolved node B (eNB) for delivering system information, comprising:
a processor; and
a memory in electronic communication with the processor, wherein instructions stored in the memory are executable to:
periodically broadcast first system information that includes types of second system information available by request;
receive from a UE a request for transmission of said second system information;
transmit said requested second system information.

Example Embodiment 12: The eNB of Example Embodiment 11, wherein the eNB transmits the requested second system information using unicast to the requesting UE.

Example Embodiment 13: The eNB of Example Embodiment 11, wherein the eNB includes no types of second system information when sending all system information by broadcast.

Example Embodiment 14: The eNB of Example Embodiment 11, wherein the eNB transmits the requested second system information by broadcast.

Example Embodiment 15: The eNB of Example Embodiment 12, wherein the eNB responds to said request from the UE with an indication indicating that said requested second system information will be unicast.

Example Embodiment 16: The eNB of Example Embodiment 14, wherein the eNB responds to said request from the UE with an indication indicating that said requested second system information will be broadcasted.

Example Embodiment 17: The eNB of Example Embodiment 15, wherein the eNB includes broadcast schedules for said requested second system information in first system information and broadcasts said first system information.

Example Embodiment 18: The eNB of Example Embodiment 14, wherein the eNB transmits said requested second system information on pre-determined radio resources.

Example Embodiment 19: The eNB of Example Embodiment 14, wherein the eNB transmits said requested second system information on the radio resources configured by the eNB.

Example Embodiment 20: The eNB of Example Embodiment 19, wherein the eNB broadcasts said radio resource configuration.

Example Embodiment 21: The eNB of Example Embodiment 14, wherein the eNB repeats the transmissions of the requested second system information multiple times.

Example Embodiment 22: The eNB of Example Embodiment 21, wherein the eNB broadcasts the number of repetitions.

Example Embodiment 23: The eNB of Example Embodiment 21, wherein the number of repetitions is given by the UE requesting the second system information.

Example Embodiment 24: A method for a user equipment (UE) comprising:
receiving first system information periodically broadcasted from eNB;
determining types of second system information to additionally receive;
transmitting to the eNB a request containing said types of the second system information;
receiving the requested second system information from the eNB.

Example Embodiment 25: A method for an evolved node B (eNB) comprising:
periodically broadcasting first system information that includes types of second system information available by request;
receiving from a UE a request for transmission of said second system information;
transmitting said requested second system information.

Example Embodiment 26: An example non-limiting aspect of the technology disclosed herein concerns an access node of a radio access network. The access node comprises a transmitter, a receiver, and processor circuitry. The transmitter is configured to transmit system information over a radio interface. The receiver is configured to receive a request message from at least one wireless terminal over the radio interface. The processor circuitry is configured: to schedule periodic transmissions by the transmitter of first type system information over the radio interface; and, in response to the request message and separately from the periodic transmissions of the first type system information, to schedule transmission by the transmitter of second type system information over the radio interface to the at least one wireless terminal.

Example Embodiment 27: The node of Example Embodiment 26, wherein the first type system information comprises information which is periodically broadcasted by the transmitter and which is required for initial access to the radio access network, and the second type system information is not required for initial access to the radio access network Example Embodiment 28: The node of Example Embodiment 26, wherein the processing circuitry is configured to generate a response message which indicates how the at least one wireless terminal can obtain the second type system information.

Example Embodiment 29: The node of Example Embodiment 26, wherein the processor circuitry is further configured to include an indication that the second type system information is available upon request in a transmission of the first type system information.

Example Embodiment 30: The node of Example Embodiment 26, wherein the processor circuitry is configured to schedule a transmission comprising the first type system information and information concerning availability of at least one block of the second type system information.

Example Embodiment 31: The node of Example Embodiment 30, wherein the information concerning availability of the at least one block of second type system information does not include content of the at least one block of second type system information.

Example Embodiment 32: The node of Example Embodiment 30, wherein the information concerning availability of the at least one block of second type information comprises a k-bit sequence corresponding to k number of blocks of second type system information, and wherein a first value for a bit of the k-bit sequence indicates availability of the corresponding block of second type system information and a second value for a bit of the k-bit sequence indicates unavailability of the corresponding block of second type system information.

Example Embodiment 33: The node of Example Embodiment 30, wherein the processing circuitry is configured to determine from, the request message received by the receiver from the at least one wireless terminal, a nth block of the k number of blocks of the second type system information requested by the at least one wireless terminal; and in response to the request message the processor circuitry is configured to schedule transmission by the transmitter of the nth block of the second type system information.

Example Embodiment 34: The node of Example Embodiment 33, wherein the processor circuitry is configured to schedule transmission of the nth block of the second type system information using dedicated downlink resources.

Example Embodiment 35: The node of Example Embodiment 33, wherein the processor circuitry is configured to schedule transmission of the nth block of the second type system information using broadcast resources.

Example Embodiment 36: The node of Example Embodiment 30, wherein the information concerning availability of the at least one block of second type system information further includes the scheduling information for at least one block of second type system information to be broadcast on the radio interface.

Example Embodiment 37: The node of Example Embodiment 36, wherein in accordance with the scheduling information the processor circuitry is configured to transmit at least one block of the second type system information second type system information in a broadcast message.

Example Embodiment 38: The node of Example Embodiment 37, wherein in accordance with the scheduling information the processor circuitry is configured to transmit at least one block of the second type system information in a plural number of broadcast messages.

Example Embodiment 39: The node of Example Embodiment 38, wherein the receiver is configured to receive over the radio interface the plural number for the plural number of broadcast messages.

Example Embodiment 40: The node of Example Embodiment 37, wherein the processor circuitry is configured (1) to broadcast the scheduling information for the second type system information; (2) in accordance with the scheduling information, to include the second type system information in a broadcast message other than a periodic broadcast of the first type system information; and (3) to repeat (1) and (2) a plural number of times.

Example Embodiment 41: The node of Example Embodiment 40, wherein the receiver is configured to receive over the radio interface the plural number of times.

Example Embodiment 42: The node of Example Embodiment 37, wherein the scheduling information is configured to indicate that the at least one block of the second type system information is included in a broadcast message other than a periodic broadcast of the first type system information.

Example Embodiment 43: The node of Example Embodiment 26, wherein the processor is configured to schedule transmission of at least one block of second type system information as a broadcast using a predetermined radio resource.

Example Embodiment 44: The node of Example Embodiment 43, wherein the predetermined resource does not carry the first type system information.

Example Embodiment 45: The node of Example Embodiment 43, wherein the predetermined resource is defined using an offset.

Example Embodiment 46: The node of Example Embodiment 43, wherein the predetermined resource is defined using a predefined periodicity.

Example Embodiment 47: The node of Example Embodiment 43, wherein the processor circuitry is configured to schedule multiple transmissions of the at least one block of second type system information as a broadcast using the predetermined radio resource.

Example Embodiment 48: The node of Example Embodiment 26, wherein the request message is an Access Request message, and upon receipt of the Access Request message the processor circuitry is configured to determine whether to transmit the second type system information by unicast or by broadcast.

Example Embodiment 49: The node of Example Embodiment 48, wherein in response to the Access Request message the processor circuitry is configured to transmit a response message that specifies a type of transmission for the second type system information, the type of transmission being either unicast or broadcast.

Example Embodiment 50: The node of Example Embodiment 48, wherein when the processor circuitry determines that the second type system information is to be transmitted by broadcast, the processor circuitry uses a predetermined radio resource for the broadcast of the second type system information.

Example Embodiment 51: The node of Example Embodiment 48, wherein when the processor circuitry determines that the second type system information is to be transmitted by broadcast, the processor circuitry includes scheduling information for the broadcast of the second type system information in a broadcast of the first type system information.

Example Embodiment 52: In another of its example aspects the technology disclosed herein concerns a method in an access node of a radio access network. In a basic example embodiment and mode the method comprises: scheduling periodic transmissions of first type system information over the radio interface; and, in response to a request message received over a radio interface from the wireless terminal and separately from the periodic transmissions of the first type system information, scheduling transmission of second type system information over the radio interface to at least one wireless terminal.

Example Embodiment 53: The method of Example Embodiment 52, wherein the first type system information comprises information which is periodically broadcasted by the transmitter and which is required for initial access to the radio access network, and where in the second type system information is not required for initial access to the radio access network.

Example Embodiment 54: The method of Example Embodiment 52, wherein the method further comprises in response to the request message which requests the second type system information; transmitting a response message which indicates how the at least one wireless terminal can obtain the second type system information.

Example Embodiment 55: The method of Example Embodiment 52, wherein the method further comprises including an indication that the second type system information is available upon request in a transmission of the first type system information.

Example Embodiment 56: The method of Example Embodiment 52, wherein the method further comprises including an indication that at least one block of the second type system information is unicast.

Example Embodiment 57: The method of Example Embodiment 52, wherein the method further comprises, in response to the request message, generating a response message that indicates that scheduling information for the at least one block of second type system information is broadcast on the radio interface.

Example Embodiment 58: The method of Example Embodiment 57, wherein the method further comprises transmitting the at least one block of second type system information in a broadcast message in accordance with the scheduling information.

Example Embodiment 59: The method of Example Embodiment 52, wherein the method further comprises transmitting the at least one block of second type system information in a broadcast message which occurs on a predetermined radio resource(s).

Example Embodiment 60: In another of its example aspects the technology disclosed herein concerns a wireless terminal which communications over a radio interface with an access node of a radio access network (RAN). In a basic example embodiment and mode the wireless terminal comprises a receiver, wireless terminal processing circuitry, and a transmitter. The receiver is configured to receive a first type system information broadcast message periodically broadcast from the access node and comprising first type system information. The wireless terminal processor circuitry is configured to generate a request message to request second type system information not included in the first type system information broadcast message. The transmitter is configured to transmit the request message to the access node. The receiver is further configured to receive the second type system information transmitted from the access node in response to the request message.

Example Embodiment 61: The wireless terminal of Example Embodiment 60, wherein the first type system information is required for initial access to the radio access network, and where in the second type system information is not required for initial access to the radio access network Example Embodiment 62: The wireless terminal of Example Embodiment 60, wherein the processor circuitry obtains from the first type system information broadcast message an indication that the second type system information is available upon request.

Example Embodiment 63: The wireless terminal of Example Embodiment 60, wherein the wireless terminal is configured to receive the second type system information in a unicast message transmitted by the access node.

Example Embodiment 64: The wireless terminal of Example Embodiment 60, wherein the wireless terminal is configured to receive the second type system information in a broadcast message transmitted by the access node.

Example Embodiment 65: The wireless terminal of Example Embodiment 64, wherein prior to receiving the second type system information the wireless terminal is configured to receive scheduling information that specifies at least one broadcast schedule for the second type system information.

Example Embodiment 66: The wireless terminal of Example Embodiment 64, wherein the receiver is configured to receive the second type system information on a predetermined radio resource.

Example Embodiment 67: The wireless terminal of Example Embodiment 64, wherein the receiver is configured to receive the second type system information on a radio resource preconfigured by the access node.

Example Embodiment 68: The wireless terminal of Example Embodiment 64, wherein the processor circuitry is configured to request plural transmissions of the second type system information.

Example Embodiment 69: The wireless terminal of Example Embodiment 60, wherein the terminal processor circuitry is configured to generate the request message only after checking whether the receiver has received the second type system information from the access node on predetermined resources.

Example Embodiment 70: The wireless terminal of Example Embodiment 60, wherein the terminal processor circuitry is configured to generate the request message only after making a predetermined number of checks whether the receiver has received the second type system information from the access node on predetermined resources.

Example Embodiment 71: The wireless terminal of Example Embodiment 60, wherein the request message is an Access Request message, and wherein the receiver is further configured to obtain from a response to the Access Request message an indication of how the second type system information will be transmitted.

Example Embodiment 72: In another of its example aspects the technology disclosed herein concerns a method in a wireless terminal which communications over a radio interface with an access node of a radio access network (RAN). In an example basic embodiment and mode the method comprises receiving a first type system information broadcast message periodically broadcast from the access node and comprising first type system information; generating a request message to request second type system information not included in the first type system information broadcast message; transmitting the request message to the access node; and, receiving the second type system information transmitted from the access node in response to the request message.

Example Embodiment 73: The method of Example Embodiment 72, wherein the first type system information is required for initial access to the radio access network, and where in the second type system information is not required for initial access to the radio access network Example Embodiment 74: The method of Example Embodiment 72, wherein the method further comprises obtaining from the first type system information broadcast message an indication that the second type system information is available upon request.

Example Embodiment 75: The method of Example Embodiment 72, wherein the method further comprises receiving the second type system information in a unicast message transmitted by the access node.

Example Embodiment 76: The method of Example Embodiment 72, wherein the method further comprises receiving the second type system information in a broadcast message transmitted by the access node.

Example Embodiment 77: The method of Example Embodiment 72, wherein the method further comprises prior to receiving the second type system information, receiving scheduling information that specifies at least one broadcast schedule for the second type system information.

Example Embodiment 78: The method of Example Embodiment 72, wherein the method further comprises receiving the second type system information on a predetermined radio resource.

Example Embodiment 79: The method of Example Embodiment 72, wherein the method further comprises receiving the second type system information on a radio resource preconfigured by the access node.

Example Embodiment 80: The method of Example Embodiment 72, wherein the method further comprises requesting plural transmissions of the second type system information.

Example Embodiment 81: The method of Example Embodiment 72, wherein the method further comprises generating the request message after checking whether the receiver has received the second type system information from the access node on predetermined resources.

Example Embodiment 82: The method of Example Embodiment 72, wherein the method further comprises generating the request message after making a predetermined number of checks whether the receiver has received the second type system information from the access node on predetermined resources.

Example Embodiment 83: The method of Example Embodiment 73, wherein the request message is an Access Request message, and wherein the method further comprises obtaining from a response to the Access Request message an indication of how the second type system information will be transmitted.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture. The instructions of such software are stored on non-transient computer readable media.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

It will be appreciated that the technology disclosed herein is directed to solving radio communications-centric issues and is necessarily rooted in computer technology and overcomes problems specifically arising in radio communications. Moreover, in at least one of its aspects the technology disclosed herein improves the functioning of the basic function of a wireless terminal and/or node itself so that, for example, the wireless terminal and/or node can operate more effectively by prudent use of radio resources.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A base station apparatus comprising:
transmitting circuitry configured to transmit, to a user equipment, first type of system information, the first type of system information being used for minimum system information, the minimum system information comprising one or more indications, each of the indications indicating whether or not one or more corresponding second type system information blocks are provided on-demand, and
receiving circuitry configured to receive a request for transmission of a corresponding second type system information block, in a case where one of the plural indications indicates that the corresponding second type system information block is provided on-demand.

2. The base station apparatus according to claim 1, wherein the minimum system information comprises information required for initial access.

3. The base station apparatus according to claim 1, wherein the transmitting circuitry is configured to transmit second type system information block based on the request.

4. A method in a base station apparatus comprising:
transmitting, to a user equipment, a first type system information block, the first type system information block being used for minimum system information, the minimum system information comprising plural indications, each of the indications indicating whether or not a corresponding second type system information block is provided on-demand, and
receiving a request for transmission of a corresponding second type system information block, in a case where one of the plural indications indicates that the corresponding second type system information blocks is provided on-demand.

5. A user equipment (UE) comprising:
receiving circuitry configured to receive, from a base station apparatus, a first type system information block, the first type system information block being used for minimum system information, the minimum system information comprising plural indications, each of the indications indicating whether or not a corresponding second type system information block is provided on-demand, and
transmitting circuitry configured to transmit a request for transmission of a corresponding second type system information block, in a case where one of the plural indications indicates that the corresponding second type system information block is provided on-demand.

6. The UE according to claim 5, wherein the minimum system information comprises information required for initial access.

7. The UE according to claim 5, wherein the receiving circuitry is configured to receive the second type system information block based on the request.

8. A method in a user equipment (UE) comprising:
receiving, from a base station apparatus, a first type system information block, the first type system information block being used for minimum system information, the minimum system information comprising plural indications, each of the indications indicating whether or not a corresponding second type system information block is provided on-demand, and
transmitting a request for transmission of a corresponding second type system information block, in a case where one of the plural indications indicates that the corresponding second type system information block is provided on-demand.

9. The base station apparatus according to claim 1, wherein the request specifies that a specific second system type information block, being one of plural second system type information blocks having corresponding indications in the first type system information block, is requested by user equipment.

10. The base station apparatus according to claim 1, wherein the minimum system information is configured to indicate that k number of second type system information blocks are provided on demand, and wherein the request specifies that a $n^{th}$ block of the k number of second type system information blocks is requested by user equipment.

11. The method according to claim 4, wherein the request specifies that a specific second system type information block, being one of plural second system type information blocks having corresponding indications in the first type system information block, is requested by user equipment.

12. The method according to claim 4, wherein the minimum system information is configured to indicate that k number of second type system information blocks are provided on demand, and wherein the request specifies that a $n^{th}$ block of the k number of second type system information blocks is requested by user equipment.

13. The UE according to claim 5, wherein the request specifies that a specific second system type information block, being one of plural second system type information blocks having corresponding indications in the first type system information block, is requested by user equipment.

14. The UE according to claim 5, wherein the minimum system information is configured to indicate that k number of second type system information blocks are provided on demand, and wherein the request specifies that a $n^{th}$ block of the k number of second type system information blocks requested by user equipment.

15. The method according to claim 8, wherein the request specifies that a specific second system type information block, being one of plural second system type information blocks having corresponding indications in the first type system information block, is requested by user equipment.

16. The method according to claim 8, wherein the minimum system information is configured to indicate that k number of second type system information blocks are provided on demand, and wherein the request specifies that a $n^{th}$ block of the k number of second type system information blocks is requested by user equipment.

* * * * *

UNITED STATES PATENT AND TRADEMARK OFFICE
CERTIFICATE OF CORRECTION

PATENT NO. : 10,687,270 B2  
APPLICATION NO. : 15/658980  
DATED : June 16, 2020  
INVENTOR(S) : Ishii Page 1 of 1

It is certified that error appears in the above-identified patent and that said Letters Patent is hereby corrected as shown below:

In the Claims

Column 23, Lines 3 through 10 (Claim 1), change the following paragraph as follows: -- transmitting circuitry configured to transmit, to a user equipment, a first type system information block, the first type system information block being used for minimum system information, the minimum system information comprising plural indications each of the plural indications indicating whether or not a corresponding second type system information block is provided on-demand, and --;

Column 23, Line 20 (Claim 3), after "to transmit", insert -- the --;

Column 23, Line 33 (Claim 4), change "blocks" to -- block --; and

Column 24, Lines 44 and 45 (Claim 14), change "blocks requested" to -- blocks is requested --.

Signed and Sealed this  
Twenty-ninth Day of September, 2020

Andrei Iancu  
*Director of the United States Patent and Trademark Office*